(12) United States Patent
Endo et al.

(10) Patent No.: US 11,910,105 B2
(45) Date of Patent: Feb. 20, 2024

(54) VIDEO PROCESSING USING A BLENDED TONE CURVE CHARACTERISTIC

(71) Applicant: SONY GROUP CORPORATION, Tokyo (JP)

(72) Inventors: Tomoyuki Endo, Tokyo (JP); Koji Kamiya, Tokyo (JP); Kei Kakidani, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 191 days.

(21) Appl. No.: 17/441,000

(22) PCT Filed: Mar. 17, 2020

(86) PCT No.: PCT/JP2020/011769
§ 371 (c)(1),
(2) Date: Sep. 20, 2021

(87) PCT Pub. No.: WO2020/203265
PCT Pub. Date: Oct. 8, 2020

(65) Prior Publication Data
US 2022/0166962 A1   May 26, 2022

(30) Foreign Application Priority Data

Mar. 29, 2019  (JP) ................. 2019-069012

(51) Int. Cl.
*H04N 23/82* (2023.01)
*H04N 1/32* (2006.01)
(Continued)

(52) U.S. Cl.
CPC ......... *H04N 23/82* (2023.01); *H04N 1/32128* (2013.01); *H04N 23/631* (2023.01); *H04N 2101/00* (2013.01); *H04N 2201/3245* (2013.01)

(58) Field of Classification Search
CPC .......... H04N 23/80; H04N 23/82; H04N 5/20; H04N 5/202; H04N 1/407–4074;
(Continued)

(56) References Cited

U.S. PATENT DOCUMENTS

| 5,287,418 | A | * | 2/1994 | Kishida | ............... | H04N 1/4072 |
| | | | | | | 382/254 |
| 2002/0057374 | A1 | * | 5/2002 | Suzuki | ............... | H04N 9/69 |
| | | | | | | 348/E5.074 |

(Continued)

FOREIGN PATENT DOCUMENTS

| JP | 6-62252 A | 3/1994 |
| JP | 2007-60393 A | 3/2007 |

(Continued)

OTHER PUBLICATIONS

International Search Report dated Jun. 9, 2020 in PCT/JP2020/011769 filed on Mar. 17, 2020, 2 pages.

*Primary Examiner* — Paul M Berardesca
(74) *Attorney, Agent, or Firm* — Oblon, McClelland, Maier & Neustadt, L.L.P.

(57) ABSTRACT

This video signal processing apparatus includes a signal processing unit that performs tone control on an input video signal having a linear characteristic and a control unit that blends two tone curve characteristics arbitrarily selected from among a plurality of tone curve characteristics prepared in advance and sets the blended tone curve characteristics for the tone control of the signal processing unit.

9 Claims, 18 Drawing Sheets

(51) Int. Cl.
*H04N 23/63* (2023.01)
*H04N 101/00* (2006.01)

(58) Field of Classification Search
CPC ............... H04N 1/6027; H04N 9/69; H04N 23/63–635; G06T 5/009; G06T 2207/20208
See application file for complete search history.

(56) References Cited

U.S. PATENT DOCUMENTS

| | | | |
|---|---|---|---|
| 2007/0047033 A1 | 3/2007 | Furui | |
| 2007/0153098 A1* | 7/2007 | Kao | H04N 21/42202 348/E5.074 |
| 2009/0009665 A1* | 1/2009 | Tsutsumi | H04N 23/84 348/E5.074 |
| 2009/0015687 A1 | 1/2009 | Shinkai et al. | |
| 2010/0201887 A1* | 8/2010 | Bakhmutsky | H04N 5/202 348/E5.074 |
| 2010/0309346 A1 | 12/2010 | Brunner | |
| 2015/0109321 A1 | 4/2015 | Valdes Lopez | |
| 2017/0018105 A1 | 1/2017 | Hasegawa et al. | |
| 2017/0256039 A1* | 9/2017 | Hsu | G06T 5/009 |
| 2018/0241979 A1* | 8/2018 | Kanda | H04N 9/68 |
| 2018/0270400 A1* | 9/2018 | Koh | G06T 7/194 |
| 2019/0265552 A1* | 8/2019 | Shiomi | G02F 1/133609 |
| 2020/0286213 A1* | 9/2020 | Unger | H04N 1/4072 |
| 2022/0021819 A1* | 1/2022 | Hatano | H04N 25/75 |

FOREIGN PATENT DOCUMENTS

| | | |
|---|---|---|
| JP | 2009-21827 A | 1/2009 |
| JP | 2015-154307 A | 8/2015 |
| JP | 2015-179502 A | 10/2015 |

* cited by examiner

VIDEO PROCESSING USING A BLENDED TONE CURVE CHARACTERISTIC

TECHNICAL FIELD

The present technology relates to a video signal processing apparatus that processes video signals, a video signal processing method, and an image pickup apparatus.

BACKGROUND ART

In order to adjust a video signal captured by an image pickup apparatus to finally provide an appearance (tone) of a picture that is intended by a user, a user performs processing of adding arbitrary curve characteristics to the video signal in addition to normal gamma processing for display gamma or optical-electro transfer function (OETF) conversion or the like.

CITATION LIST

Patent Literature

Patent Literature 1: Japanese Patent Application Laid-open No. 2015-154307

DISCLOSURE OF INVENTION

Technical Problem

As described above, the user performs the processing of adding the arbitrary curve characteristics (tone curve characteristics) to the video signal in addition to the normal gamma processing for the display gamma or optical-electro transfer function (OETF) conversion or the like. At that time, tone curve characteristics to be added are selected and applied from among a plurality of tone curve characteristics prepared in advance, and therefore a tone intended by the user cannot be always obtained.

In view of this, it is an object of the present technology to provide a video signal processing apparatus, a video signal processing method, and an image pickup apparatus, by which a tone intended by the user can be obtained.

Solution to Problem

In order to solve the above-mentioned problem, a video signal processing apparatus according to an embodiment of according to the present technology includes: a control unit that blends two tone curve characteristics selected from among a plurality of tone curve characteristics prepared in advance; and a signal processing unit that performs processing of adding the tone curve characteristics blended by the control unit to an input video signal having a linear characteristic.

In the above-mentioned video signal processing apparatus, the control unit may be configured to blend a plurality of tone curve characteristics at a ratio selected by a user.

The above-mentioned video signal processing apparatus may further include a user interface that receives, from the user, selection of arbitrary two or three tone curve characteristics from among four or more tone curve characteristics prepared in advance and receives, from the user, selection of two tone curve characteristics to be blended out of the two or three tone curve characteristics and a parameter for calculating a blend ratio of the two tone curve characteristics.

In the above-mentioned video signal processing apparatus, the control unit may be configured to read from the storage unit information regarding two or three tone curve characteristics selected by the user.

In the above-mentioned video signal processing apparatus, the control unit may be configured to save the information regarding the blended tone curve characteristics in the storage unit.

The signal processing unit may perform tone control by using a look-up table.

The information regarding the tone curve characteristics may be a correspondence table between an input signal and an output signal.

The above-mentioned video signal processing apparatus may further include a user interface superimposing unit that superimposes an image of the user interface on an output video signal of the signal processing unit.

In the above-mentioned video signal processing apparatus, the control unit may perform control to transmit transmission information to a video recording apparatus, the transmission information being obtained by adding metadata to the output video signal of the signal processing unit, the metadata including information regarding the selected two or three tone curve characteristics and the parameter.

A video signal processing method according to another embodiment of the present technology is characterized by: by a control unit, blending two tone curve characteristics arbitrarily selected from among a plurality of tone curve characteristics prepared in advance; and setting the blended tone curve characteristics to a signal processing unit that adds the blended tone curve characteristics to an input video signal having a linear characteristic.

An image pickup apparatus according to another embodiment of the present technology includes: an image pickup unit having an image pickup element; a control unit that blends two tone curve characteristics selected from among a plurality of tone curve characteristics prepared in advance; and a signal processing unit that performs processing of adding the tone curve characteristics blended by the control unit to an input video signal having a linear characteristic, the input video signal being generated by the image pickup unit.

MODE(S) FOR CARRYING OUT THE INVENTION

Hereinafter, embodiments according to the present technology will be described.

First Embodiment

Figure 1:
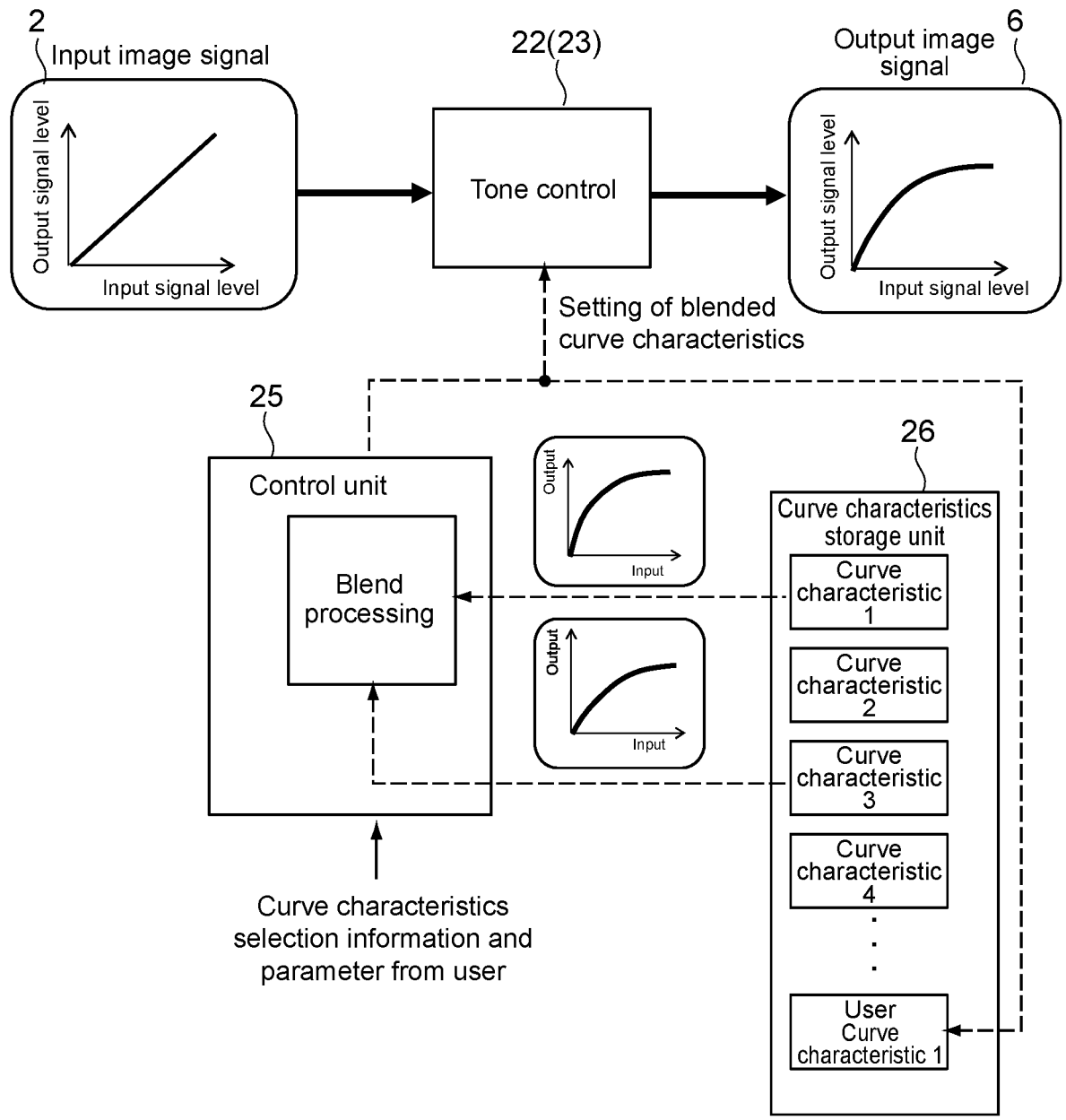
FIG. 1 A diagram showing the outline of a video signal processing apparatus according to a first embodiment of the present technology.

[Outline of this Embodiment]
FIG. 1 is a diagram showing the outline of a video signal processing apparatus according to a first embodiment of the present technology.

As shown in the figure, a video signal processing apparatus 20 according to the embodiment of the present technology includes
a video signal processing unit 22 (23) that performs tone control on an input video signal 2 having a linear characteristic, and
a control unit 25 that blends two tone curve characteristics arbitrarily selected from among a plurality of tone curve characteristics stored in advance in a card characteristics storage unit 26 and sets the blended tone curve characteristics for the tone control of the video signal processing unit 22 (23).

In accordance with the video signal processing apparatus 20 according to the embodiment of the present technology, the control unit 25 blends the two tone curve characteristics arbitrarily selected by the user from among the plurality of tone curve characteristics stored in advance in the curve characteristics storage unit 26 and the video signal processing unit 22 (23) performs tone control on the input video signal 2 having the linear characteristic by using the blended tone curve characteristics. Therefore, the tone curve characteristics set for the tone control can be easily changed without requiring user's work of, by the user, newly generating tone curve characteristics, modifying existing tone curve characteristics, or the like.

Moreover, in the video signal processing apparatus 20 according to the embodiment of the present technology, a control unit 5 is capable of performing tone control by using the tone curve characteristics obtained by blending the two tone curve characteristics at a ratio arbitrarily selected by the user. Accordingly, many tone curve characteristics can be sequentially set with the blend ratio of the two tone curve characteristics changed.

Hereinafter, a configuration of the image pickup system 100 including the video signal processing apparatus 20 according to the first embodiment of the present technology will be described in detail.

Figure 2:
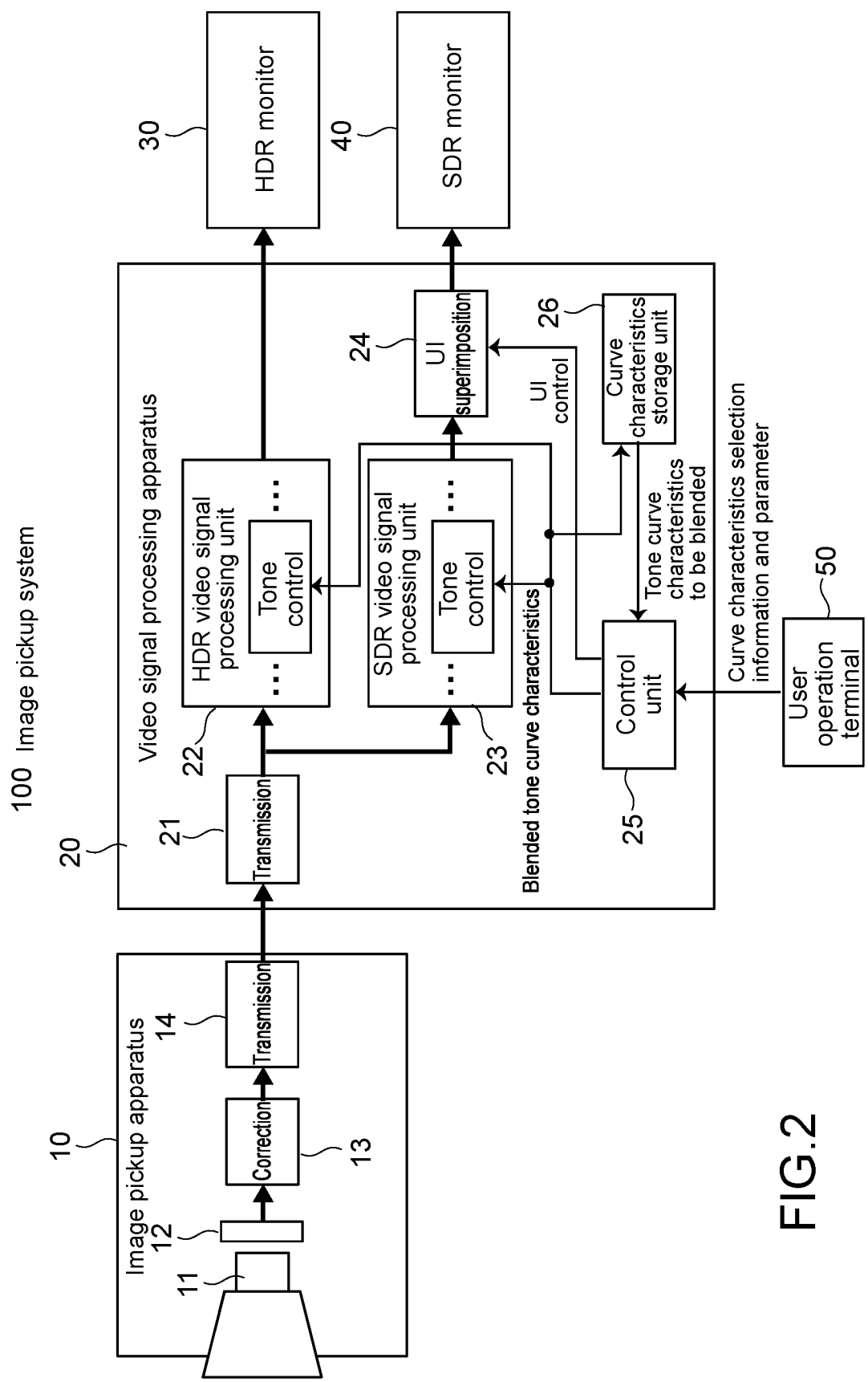
FIG. 2 A block diagram showing a configuration of an image pickup system 100 including a video signal processing apparatus 20 according to the first embodiment of the present technology.

[Configuration of Image Pickup System 100]
FIG. 2 is a block diagram showing the configuration of the image pickup system 100 including the video signal processing apparatus 20 according to the first embodiment of the present technology.

The image pickup system 100 according to this embodiment includes an image pickup apparatus 10, the video signal processing apparatus 20, a high dynamic range (HDR) monitor 30, a standard dynamic range (SDR) monitor 40, and a user operation terminal 50.

The image pickup apparatus 10 includes an optical system 11, an image pickup unit 12, a correction unit 13, and a transmission unit 14. The optical system 11 has a lens group for image pickup. The image pickup unit 12 has an image pickup element such as a complementary metal-oxide-semiconductor (CMOS) element and a charge-coupled device (CCD) for example that converts light entering through the optical system 11 into an electric pixel signal depending on the light intensity in the image pickup element. The correction unit 13 performs defective-pixel correction, shading correction, black-level correction, and the like on an input video signal generated by the image pickup unit 12. The transmission unit 14 performs encoding according to a signal system suitable for inter-device transmission, for example, compression or parallel-serial conversion of a video signal passing through the correction unit 13.

The video signal processing apparatus 20 includes a transmission unit 21 and the HDR video signal processing unit 22. The transmission unit 21 receives an input video signal transmitted by the image pickup apparatus 10 and performs processing such as decompression and decoding. The HDR video signal processing unit 22 generates an HDR video signal by performing, on an input video signal received by the transmission unit 21, addition of curve characteristics for video output and the like, such as tone control, matrix processing, detail and knee processing, and HDR optical-electro transfer function (OETF) conversion.

The HDR video signal generated by the HDR video signal processing unit 22 is transmitted to and displayed on the HDR monitor 30.

The video signal processing apparatus 20 further includes the SDR video signal processing unit 23 and a UI superimposing unit 24. The SDR video signal processing unit 23 generates an SDR video signal by performing, on the input video signal received by the transmission unit 21, addition of curve characteristics for video output and the like, such as resolution conversion, tone control, matrix processing, detail and knee processing, and SDR gamma processing. The UI superimposing unit 24 superimposes a UI image for setting associated with blend processing of the tone curve characteristics on the generated SDR video signal. The generated SDR video signal or the SDR video signal on which the UI image is superimposed is transmitted to and displayed on the SDR monitor 40. It is to be noted that in the HDR video signal processing unit 22 and the SDR video signal processing unit 23, the tone control on the input video signal is performed by referring to a look-up table or the like, for example. It is to be noted that the tone control set forth herein may include normal gamma processing for display gamma or optical-electro transfer function (OETF) conversion or the like in addition to the user's processing of adding arbitrary curve characteristics to the video signal, i.e., control using the tone curve characteristics. Alternatively, the tone control set forth herein may include only the control using the tone curve characteristics. In this case, the normal gamma processing for display gamma or optical-electro transfer function (OETF) conversion or the like may be performed by the video signal processing apparatus 20 as processing at a stage subsequent to this processing, for example.

The video signal processing apparatus 20 further incudes the control unit 25 and the curve characteristics storage unit 26.

Information regarding a plurality of tone curve characteristics is saved in the curve characteristics storage unit 26.

The control unit 25 controls the video signal processing apparatus 20. On the basis of information set by the user through the user operation terminal 50 with respect to a UI for setting associated with the blend processing of the tone curve characteristics, the control unit 25 reads from the curve characteristics storage unit 26 information regarding the corresponding two or three tone curve characteristics and calculates a blend ratio, blends two tone curve characteristics to be blended of the two or three tone curve characteristics at the blend ratio, and generates tone curve characteristics to be used for tone control of the HDR video signal processing unit 22 and the SDR video signal processing unit 23.

The user operation terminal 50 may include, for example, operation keys, a mouse, a trackball, a dial, a lever, a touch sensor panel, a remote controller, and the like. Alternatively, the user operation terminal 50 may include a combination of a display provided in the main body of the image pickup apparatus 10 with a touch panel sensor disposed on this display and operation elements such as switches, buttons, and keys provided in the main body of the image pickup apparatus 10.

In this video signal processing apparatus 20, when the user selects two or three tone curve characteristics and a parameter through the user operation terminal 50 with respect to the UI for setting associated with the blend processing of the tone curve characteristics that is superimposed on the SDR video signal and displayed on the SDR monitor 40, the control unit 25 calculates, on the basis of the parameter, two tone curve characteristics to be blended out of the selected two or three tone curve characteristics and a blend ratio of these two tone curve characteristics and generates tone curve characteristics obtained by blending these two tone curve characteristics at the blend ratio.

The control unit 25 sets the generated tone curve characteristics to each of the HDR video signal processing unit 22 and the SDR video signal processing unit 23. Accordingly, the HDR video signal and the SDR video signal subjected to the same tone control are displayed on the HDR monitor 30 and the SDR monitor 40. When the user thereafter changes the parameter through the user operation terminal 50 from this state, the control unit 25 recalculates, on the basis of the changed parameter, two tone curve characteristics to be blended and a blend ratio of these two tone curve characteristics, generates new tone curve characteristics obtained by blending these two tone curve characteristics at the blend ratio, and sets these new tone curve characteristics to the HDR video signal processing unit 22 and the SDR video signal processing unit 23 again. Accordingly, the user can check in real time how the change in blend ratio based on the parameter is reflected on the tone of the output video signal. In addition, a change in the blend ratio selection value is also reflected on the SDR video signal on which the UI image is superimposed. Therefore, the user can perform an operation of changing the parameter while checking the appearance of the SDR video signal displayed on the SDR monitor 40, and the user operability is improved.

In addition, the control unit 25 saves the generated tone curve characteristics in the curve characteristics storage unit 26 as information regarding user tone curve characteristics.

It is to be noted that although the UI image is superimposed on the SDR video signal in the above description, the UI image may be superimposed on the HDR video signal.

{Configuration of UI}

Next, a configuration example of the UI for setting associated with the blend processing of the tone curve characteristics will be described.

Figure 3:
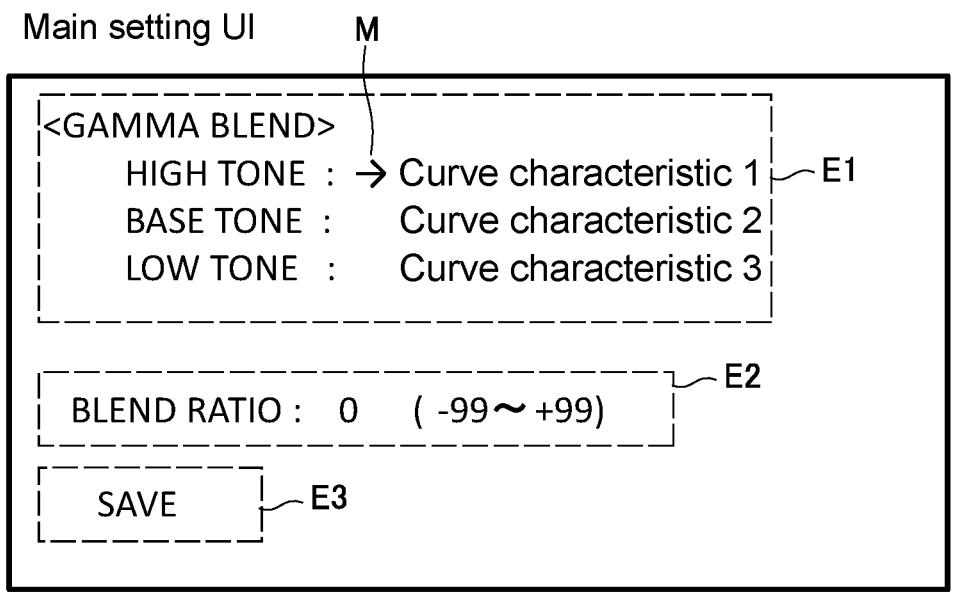
FIG. 3 A diagram showing an example of a main setting UI according to the present technology.

FIG. 3 is a diagram showing an example of a main setting UI.

This main setting UI includes a curve characteristics setting area E1 for setting two or three arbitrary tone curve characteristics, a parameter setting area E2 for setting a parameter for calculating two tone curve characteristics to be blended out of the two or three tone curve characteristics selected in the curve characteristics setting area E1 and a blend ratio of these two tone curve characteristics, a save instruction area E3 for instructing to set and save tone curve characteristics as a blend result, and a mark M indicating a selection item.

In the parameter setting area E2, any one of values of from "−99" to "+99" can be selected as the parameter.

In the curve characteristics setting area E1, at most three tone curve characteristics of HIGH_TONE, BASE_TONE, and LOW_TONE can be set. BASE_TONE is a tone curve characteristic that is a reference for the blend processing. For example, when "0" is selected as the parameter in the parameter setting area E2, the tone curve characteristic of BASE_TONE is output as the blend result of the tone curve characteristics as it is.

HIGH_TONE is a tone curve characteristic blended with the tone curve characteristic of BASE_TONE at a blend ratio depending on the value of the parameter selected by the user in the range of from "+99" to "+1". For example, when "+99" is selected as the parameter in the parameter setting area E2, the tone curve characteristic of HIGH_TONE is output as the blend result of the tone curve characteristics as it is.

LOW_TONE is a tone curve characteristic blended with the tone curve characteristic of BASE_TONE at the blend ratio depending on the value of the parameter selected by the user in the range of from "−99" to "−1". For example, when "−99" is selected as the parameter in the parameter setting area E2, the tone curve characteristic of LOW_TONE is output as the blend result of the tone curve characteristics as it is.

The mark M indicates an item that can be selected by the user. It is to be noted that in FIG. 3, the mark M indicates the item of HIGH_TONE of the curve characteristics setting area E1. The position of the mark M can be scrolled by an operation on an operation element for scrolling the mark, which is provided in the user operation terminal 50. When the user operates a validation operation element provided in the user operation terminal 50 with the item of HIGH_TONE indicated by the mark M, the display is switched to a HIGH_TONE setting UI.

Figure 4:
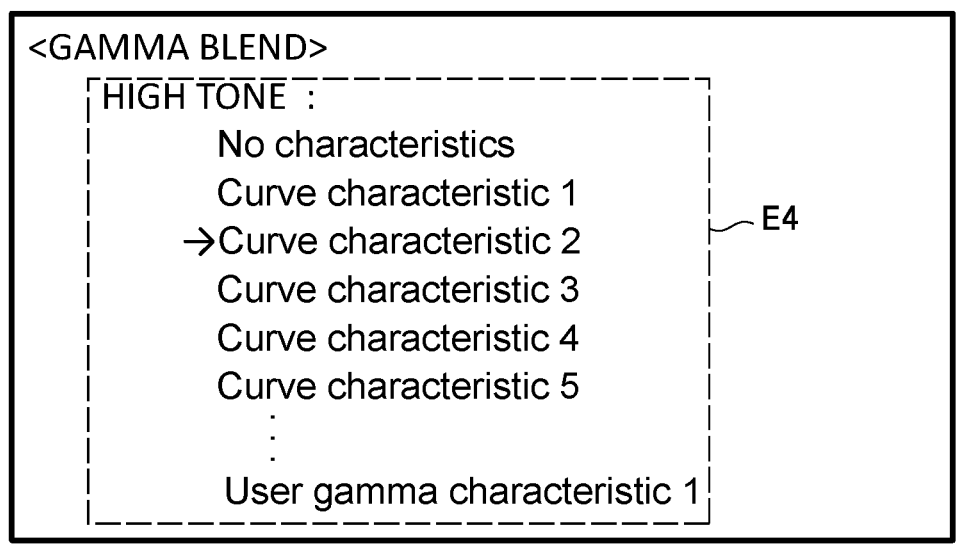
FIG. 4 A diagram showing an example of a HIGH_TONE setting UI according to the present technology.

FIG. 4 is a diagram showing an example of the HIGH_TONE setting UI.

As shown in the figure, in the HIGH_TONE setting UI, a selection area E4 of the tone curve characteristics and the user tone curve characteristics stored in the curve characteristics storage unit 26 is displayed. The user can select arbitrary tone curve characteristics from among the tone curve characteristics displayed in this selection area E4 by operating the user operation terminal 50 to perform a scroll operation of the mark M and a validation operation. It is to be noted that a selection item for selecting not to set the tone curve characteristic that is HIGH_TONE is also provided in the selection area E4.

When the setting is completed in the HIGH_TONE setting UI, the main setting UI shown in FIG. 3 is displayed again. Then, setting of BASE_TONE or setting of LOW_TONE can be similarly performed.

It is to be noted that the types of the tone curve characteristics displayed in the selection area E4 are limited so as to disable tone curve characteristics duplicated among HIGH_TONE, LOW_TONE, and BASE_TONE to be set, e.g., so as to disable the tone curve characteristic already set in the HIGH_TONE setting UI to be set as LOW_TONE or BASE_TONE.

Figure 5:
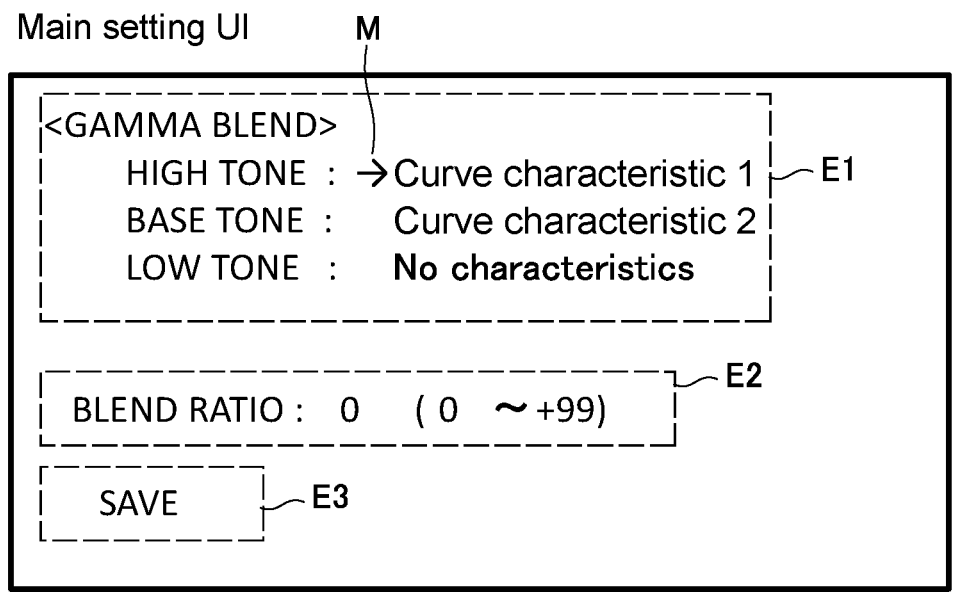
FIG. 5 A diagram showing another example of the main setting UI according to the present technology.

FIG. 5 is a diagram showing a main setting UI switched and displayed after the respective tone curve characteristics of HIGH_TONE and BASE_TONE are selected in the respective setting UIs and "no characteristics" are selected with respect to LOW_TONE. In this case, the range of the parameter that can be set in the parameter setting area E2 is automatically changed to the range of from "0" to "+99". Selection of an invalid parameter can be accordingly avoided.

When the setting of the two or three arbitrary tone curve characteristics in the curve characteristics setting area E1 and the setting of the parameter in the parameter setting area E2 are completed, the user scrolls the mark M to the position of the save instruction area E3 through the user operation terminal 50 and performs a validation operation. Then, the control unit 25 calculates, on the basis of the set parameter, two tone curve characteristics to be blended out of the two or three arbitrary tone curve characteristics set in the curve characteristics setting area E1 and a blend ratio of the two tone curve characteristics to be blended. Then, the control unit 25 generates new tone curve characteristics obtained by blending the two tone curve characteristics to be blended at the blend ratio, sets the new tone curve characteristics to the HDR video signal processing unit 22 and the SDR video signal processing unit 23, and saves information regarding the new tone curve characteristics as information regarding user tone curve characteristics in the curve characteristics storage unit 26.

Figure 6:
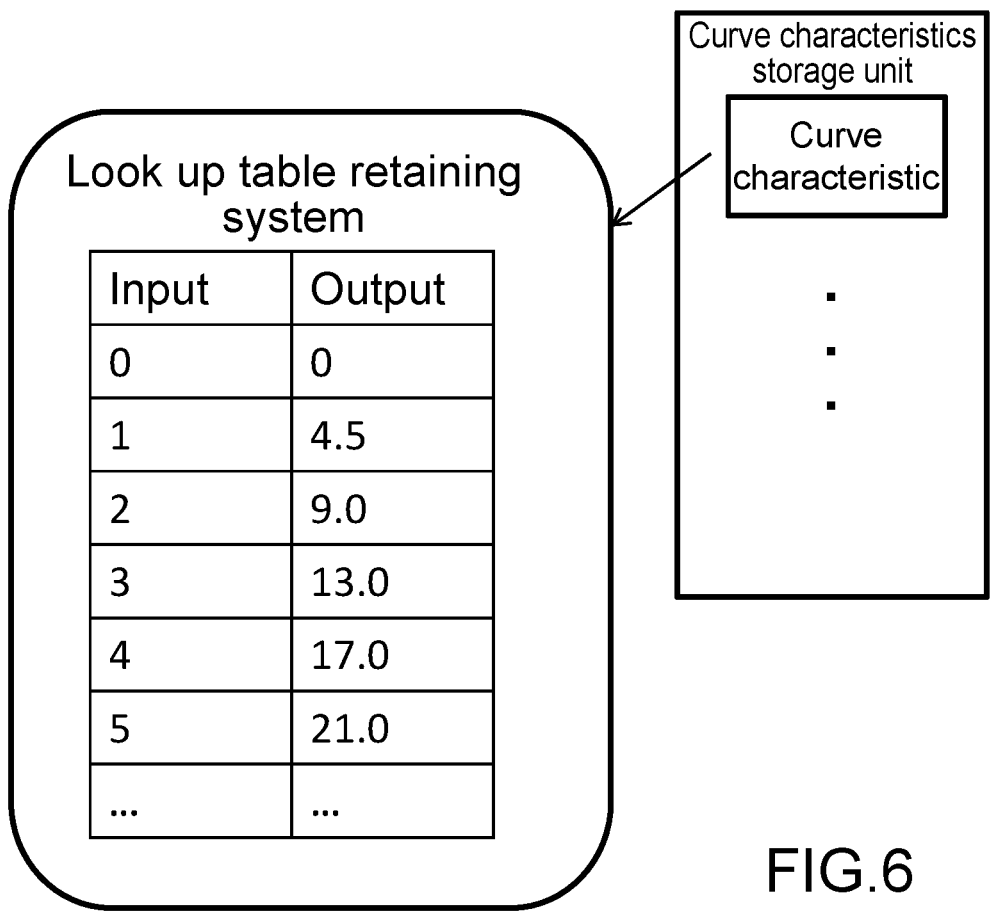
FIG. 6 A diagram showing a configuration example of information regarding tone curve characteristics according to the present technology.

FIG. 6 is a diagram showing a configuration example of the information regarding the tone curve characteristics stored in the curve characteristics storage unit 26.

As shown in the figure, the information regarding the tone curve characteristics may be configured in accordance with a table form in which inputs are related to outputs. Accordingly, in a case where the HDR video signal processing unit 22 and the SDR video signal processing unit 23 are configured to perform tone control by referring to the look-up table, the tone curve characteristics for the tone control can be updated at once by overwriting table information of the tone curve characteristics on the look-up table. That is, the tone curve characteristics for the tone control can be updated for a very short time and the influence on imaging can be reduced at the minimum.

It is to be noted that the information regarding the tone curve characteristics is not limited to the table form, and may be saved in the function form.

Specific Example of Blend Processing of Tone Curve Characteristics

Next, a specific example of the blend processing of the tone curve characteristics will be described.

Specific Example 1 of Blend Processing

Figure 7:
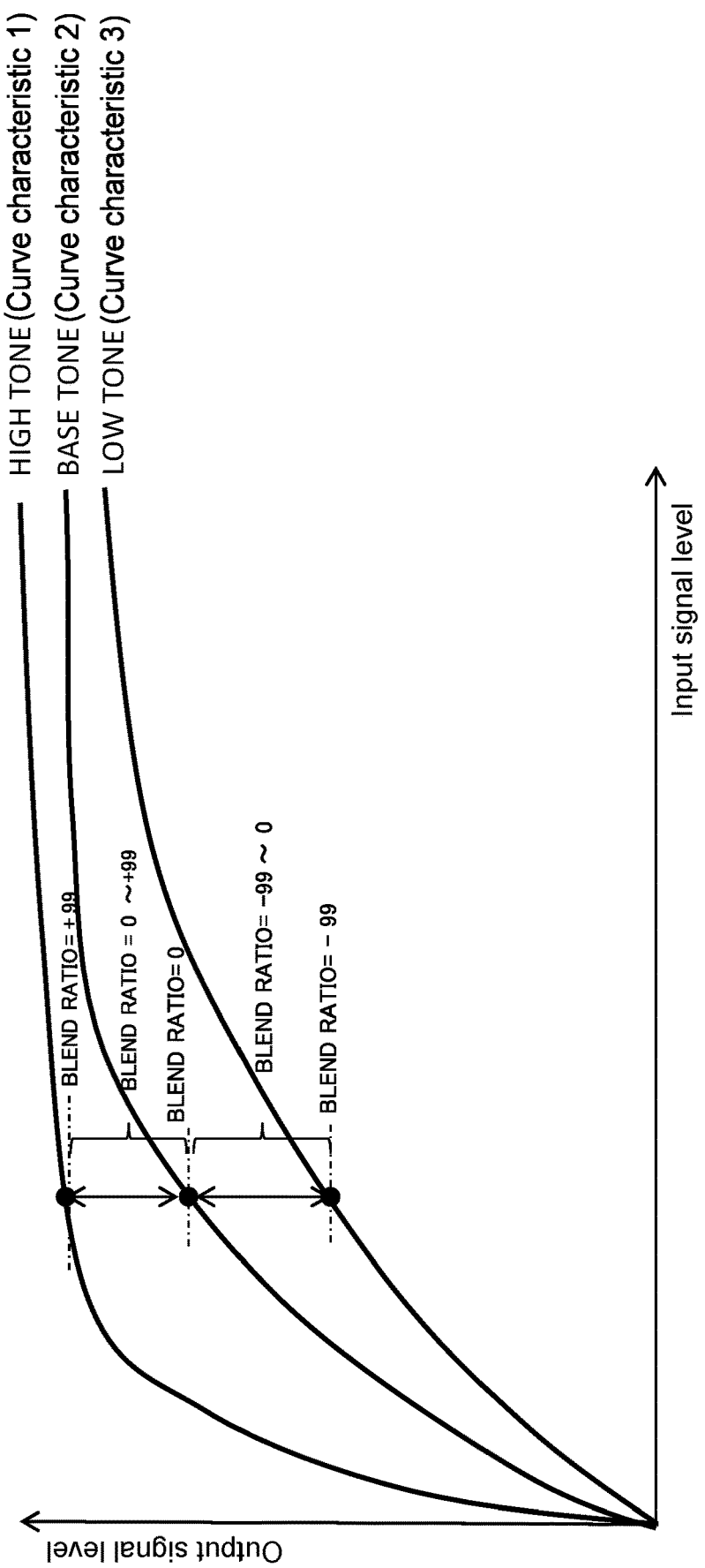
FIG. 7 A diagram showing an example of three tone curve characteristics, HIGH_TONE, BASE_TONE, and LOW_TONE, selected by a user through a UI according to the present technology.

FIG. 7 is a diagram showing an example of the three tone curve characteristics of HIGH_TONE, BASE_TONE, and LOW_TONE that are selected by the user in the UI for setting associated with the blend processing of the tone curve characteristics.

In this case, the control unit 25 obtains a blend result of the tone curve characteristics on the basis of a parameter (BLEND RATIO) arbitrarily selected by the user in the range of from "−99" to "+99".

For example, in a case where "−99" is selected as the parameter, the control unit 25 outputs the tone curve characteristic of LOW_TONE (a curve characteristic 3) as the blend result as it is.

Moreover, in a case where "0" is selected as the parameter, the control unit 25 outputs the tone curve characteristic of BASE_TONE (a curve characteristic 2) as the blend result as it is.

In addition, in a case where "+99" is selected as the parameter, the control unit 25 outputs the tone curve characteristic of HIGH_TONE (a curve characteristic 1) as the blend result.

Specific Example 2 of Blend Processing

Figure 8:
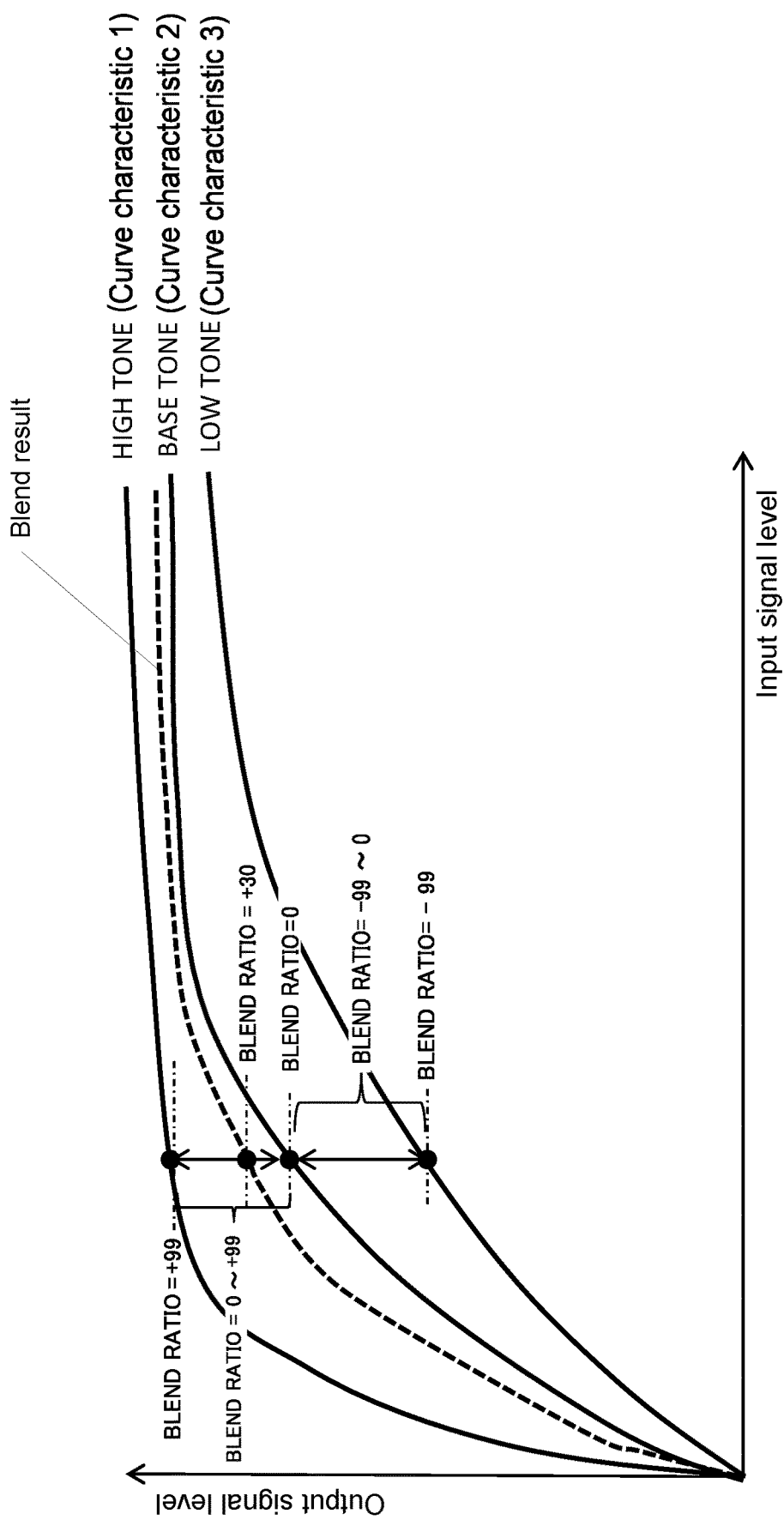
FIG. 8 A diagram showing an example of a blend result of tone curve characteristics in a case where "+30" is selected as a parameter.

FIG. 8 is a diagram showing an example of the blend result of the tone curve characteristics in a case where an arbitrary value (e.g., "+30") in the range of "+1" to "+99" is selected as the parameter in a state in which the user has selected the three tone curve characteristics of HIGH_TONE, BASE_TONE, and LOW_TONE shown in FIG. 7. In this case, the control unit 25 blends the tone curve characteristic (the curve characteristic 1) of HIGH_TONE and the tone curve characteristic (the curve characteristic 2) of BASE_TONE at a blend ratio α calculated on the basis of the parameter.

For example, assuming that the tone curve characteristic (the curve characteristic 1) of HIGH_TONE is denoted by Ch, the tone curve characteristic (the curve characteristic 2) of BASE_TONE is denoted by Cb, and the blend ratio is denoted by a, the tone curve characteristics as the blend result are calculated in accordance with the following expression.

$$Cb+(|Ch-Cb|*(\alpha/|Ch-Cb|)$$

It is to be noted that in FIG. 8, the dotted line indicates a blend result of the tone curve characteristics in a case where "+30" is set as the parameter. In this case, the blend ratio of the tone curve characteristic (the curve characteristic 1) of HIGH_TONE and the tone curve characteristic (the curve characteristic 2) of BASE_TONE is 3:7.

Specific Example 3 of Blend Processing

Figure 9:
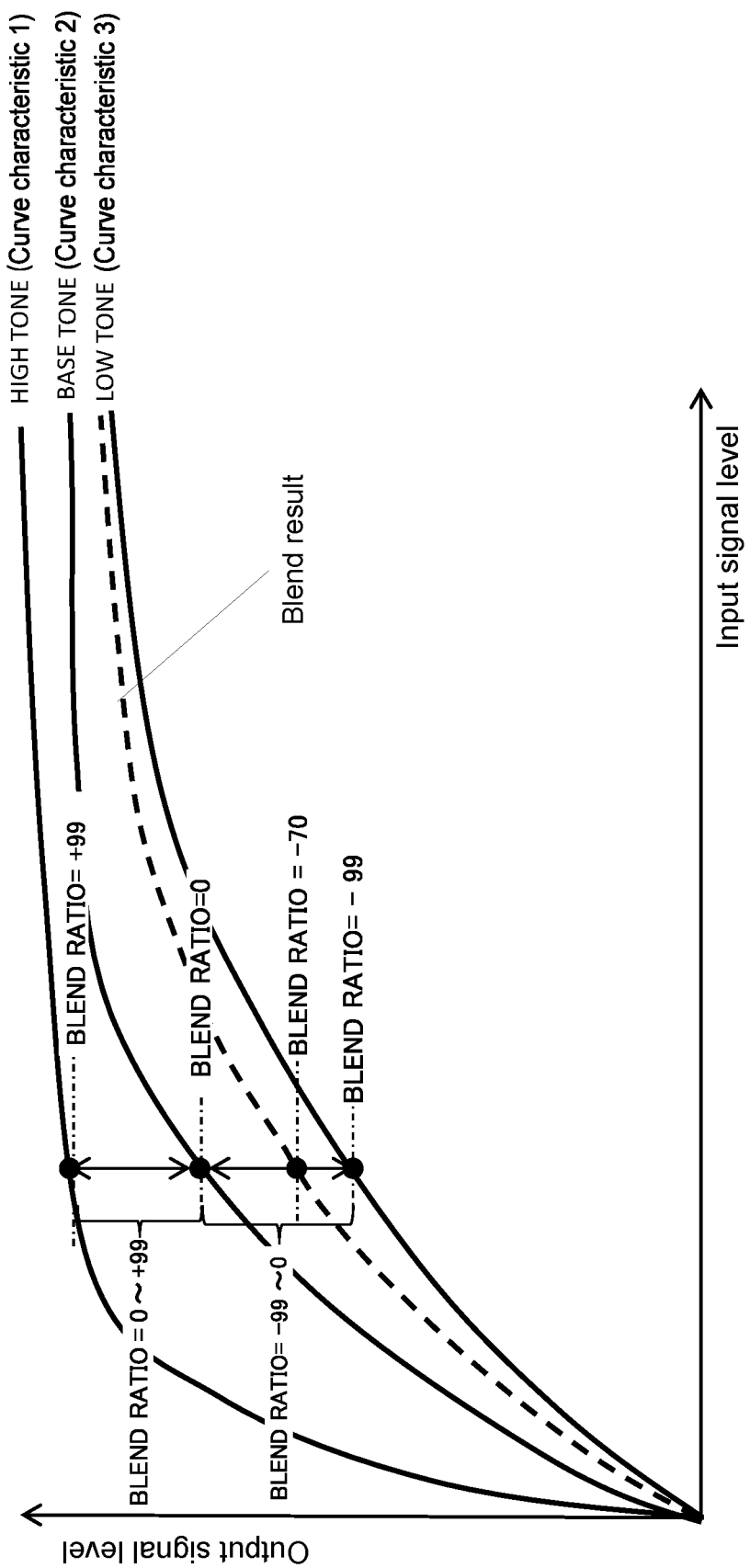
FIG. 9 A diagram showing an example of a blend result of the tone curve characteristics in a case where "−70" is selected as the parameter.

FIG. 9 is a diagram showing blend processing in a case where an arbitrary value (e.g., "−70") in the range of "−1" to "−99" is selected as the parameter in a state in which the user has selected the three tone curve characteristics of HIGH_TONE, BASE_TONE, and LOW_TONE shown in FIG. 7 through the setting UI. In this case, the control unit 25 blends the tone curve characteristic (the curve characteristic 2) of BASE_TONE and the tone curve characteristic (the curve characteristic 3) of LOW_TONE at the blend ratio calculated on the basis of the parameter.

In FIG. 9, the dotted line indicates a blend result of the tone curve characteristics in a case where "−70" is selected as the parameter. In this case, the blend ratio of the tone curve characteristic (the curve characteristic 2) of BASE_TONE and the tone curve characteristic (the curve characteristic 3) of LOW_TONE is 3:7.

Specific Example 4 of Blend Processing

Figure 10:
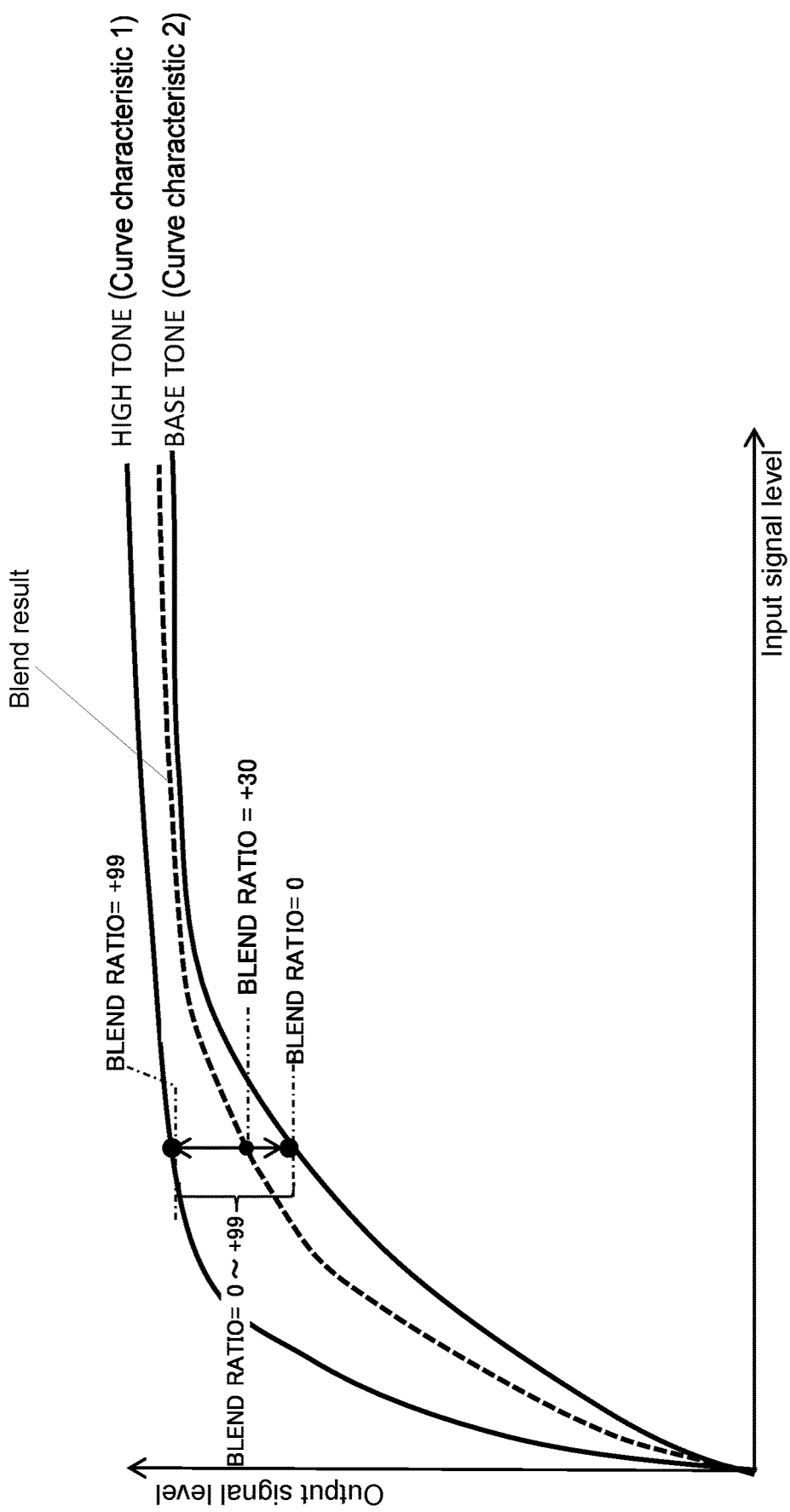
FIG. 10 A diagram showing the tone curve characteristic of HIGH_TONE and the tone curve characteristic of BASE_TONE, which are selected by the user through a setting UI, and an example of a blend result of these tone curve characteristics.

FIG. 10 is a diagram showing an example of the tone curve characteristic (the curve characteristic 1) of HIGH_TONE and the tone curve characteristic (the curve characteristic 2) of BASE_TONE, which are selected by the user through the UI for setting associated with the blend processing of the tone curve characteristics, and a blend result of these tone curve characteristics.

In this case, the control unit 25 obtains the blend result of the tone curve characteristics on the basis of a parameter (BLEND RATIO) arbitrarily selected by the user in the range of from "0" to "+99".

For example, in a case where "0" is selected as the parameter, the control unit 25 outputs the tone curve characteristic (the curve characteristic 2) of BASE_TONE as the blend result as it is.

In a case where "+99" is selected as the parameter, the control unit 25 outputs the tone curve characteristic (the curve characteristic 1) of HIGH_TONE as the blend result.

In a case where "+30" is selected as the parameter, the control unit 25 outputs a result of blending the tone curve characteristic (the curve characteristic 1) of HIGH_TONE and the tone curve characteristic (the curve characteristic 2) of BASE_TONE at the blend ratio of 3:7.

Specific Example 5 of Blend Processing

Figure 11:
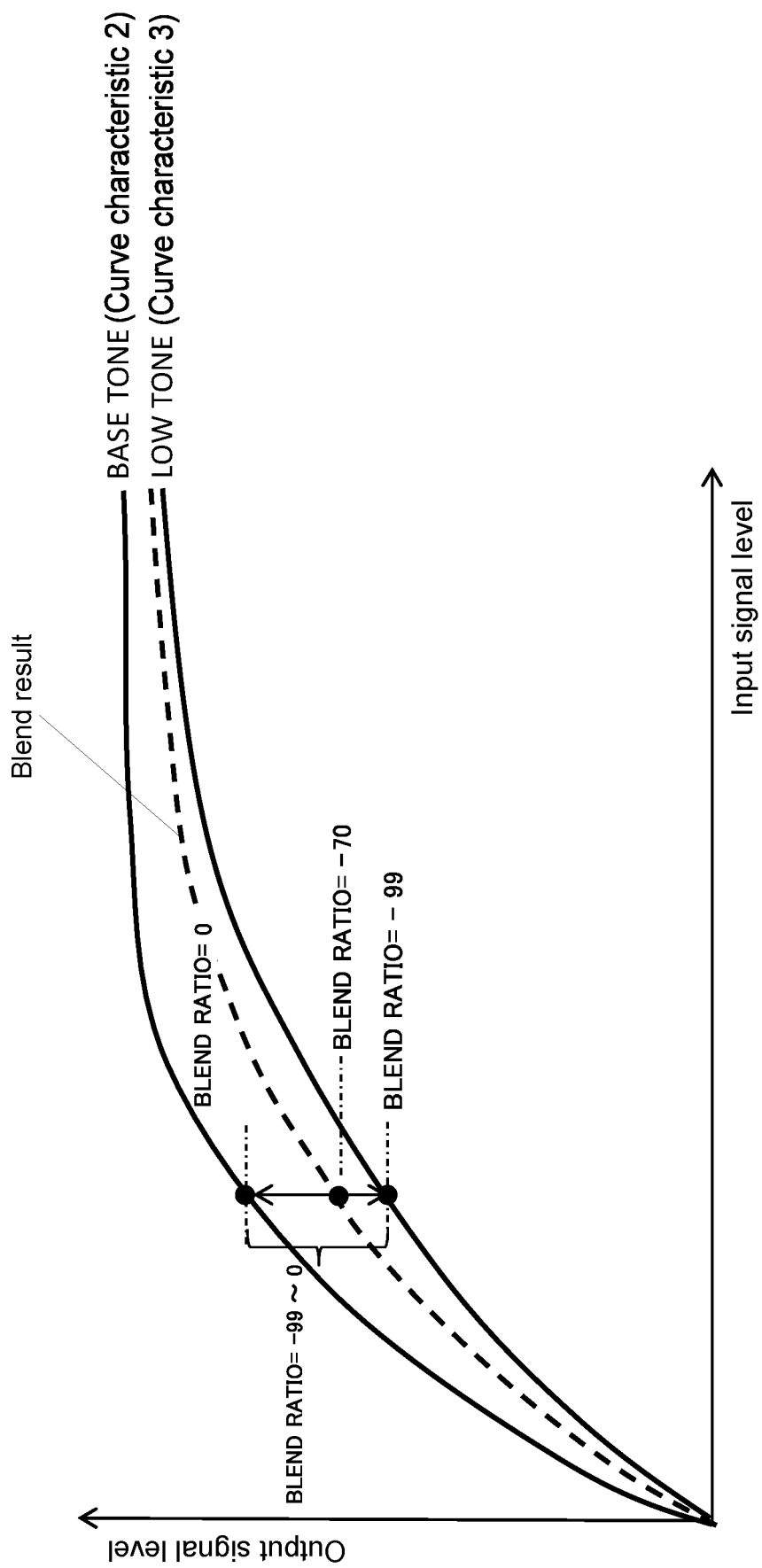
FIG. 11 A diagram showing the tone curve characteristic of BASE_TONE and the tone curve characteristic of LOW_TONE, which are selected by the user through a setting UI, and an example of a blend result of these tone curve characteristics.

FIG. 11 is a diagram showing an example of the tone curve characteristic (the curve characteristic 2) of BASE_TONE and the tone curve characteristic (the curve characteristic 3) of LOW_TONE, which are selected by the user through the setting UI associated with the blend processing of the tone curve characteristics, and a blend result of these tone curve characteristics.

In this case, the control unit 25 obtains the blend result of the tone curve characteristics on the basis of a parameter (BLEND RATIO) arbitrarily selected by the user in the range of from "0" to "−99".

For example, in a case where "0" is selected as the parameter, the control unit 25 outputs the tone curve characteristic (the curve characteristic 2) of BASE_TONE as the blend result as it is.

In a case where "−99" is selected as the parameter, the control unit 25 outputs the tone curve characteristic (the curve characteristic 3) of LOW_TONE as the blend result.

In a case where "−70" is selected as the parameter, the control unit 25 outputs a result of blending the tone curve characteristic (the curve characteristic 2) of BASE_TONE and the tone curve characteristic (the curve characteristic 3) of LOW_TONE at the blend ratio of 3:7.

Specific Example 6 of Blend Processing

Figure 12:
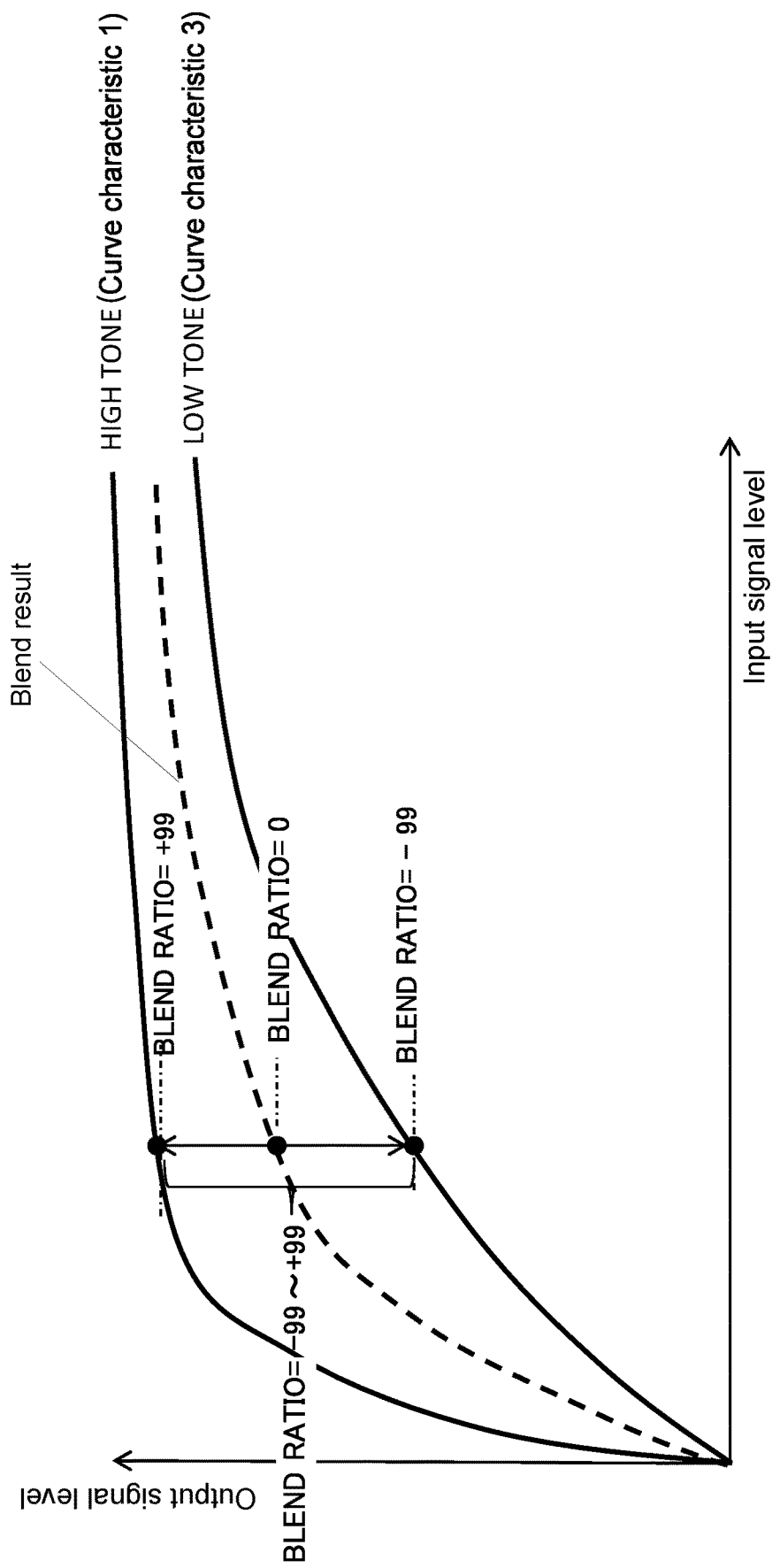
FIG. 12 A diagram showing the tone curve characteristic of HIGH_TONE and the tone curve characteristic of LOW_TONE, which are selected by the user through a setting UI, and an example of a blend result of these tone curve characteristics.

FIG. 12 is a diagram showing an example of the tone curve characteristic (the curve characteristic 1) of HIGH_TONE and the tone curve characteristic (the curve characteristic 3) of LOW_TONE, which are selected by the user through the setting UI associated with the blend processing of the tone curve characteristics, and a blend result of these tone curve characteristics.

In this case, the control unit 25 obtains the blend result of the tone curve characteristics on the basis of a parameter (BLEND RATIO) arbitrarily selected by the user in the range of from "−99" to "+99".

For example, in a case where "−99" is selected as the parameter, the control unit 25 outputs the tone curve characteristic (the curve characteristic 3) of LOW_TONE as the blend result as it is.

In a case where "+99" is selected as the parameter, the control unit 25 outputs the tone curve characteristic (the curve characteristic 1) of HIGH_TONE as the blend result as it is.

In a case where "0" is selected as the parameter, the control unit 25 outputs a result of blending the tone curve characteristic (the curve characteristic 1) of HIGH_TONE and the tone curve characteristic (the curve characteristic 3) of LOW_TONE at the ratio of 1:1.

As described above, in this embodiment, the user selects two or three tone curve characteristics from among HIGH_TONE, BASE_TONE, and LOW_TONE as candidates to be blended to thereby determine a selectable range of the parameter. Then, the user selects a parameter corresponding to an arbitrary blend ratio in the range of this parameter. As a result, a blend result of the two tone curve characteristics of HIGH_TONE, BASE_TONE, and LOW_TONE can be set for the tone control. That is, only by performing the operation of changing the parameter, the user can update the tone curve characteristics to be set for the tone control with the blend result of the two tone curve characteristics out of the at most three tone curve characteristics.

[Supplement]

Figure 13:
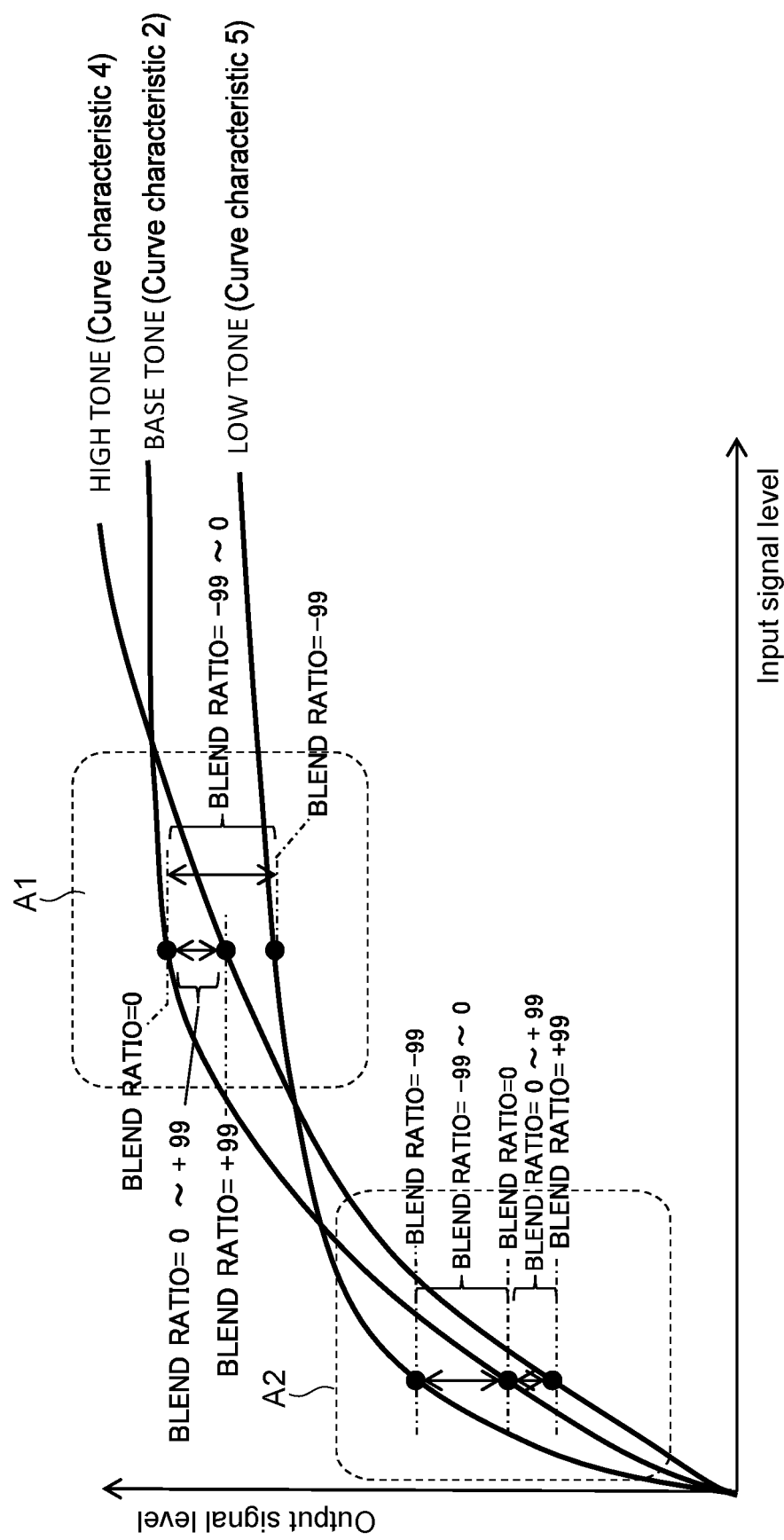
FIG. 13 A diagram showing three tone curve characteristics whose high and low relationship is different in a high and low signal level range.

By the way, the high and low relationship of the two or three tone curve characteristics to be blended is not necessarily fixed in all signal level ranges. For example, as shown in FIG. 13, the high and low relationship can also be switched between different two signal level ranges. In this example, in a relatively high signal level range A1, the order of the tone curve characteristic (the curve characteristic 2) of BASE_TONE, the tone curve characteristic of HIGH_T-ONE (a curve characteristic 4), and the tone curve characteristic of LOW_TONE (a curve characteristic 5) is a descending order of level. Meanwhile, in a relatively low signal level range A2, such an order is changed to the order of the tone curve characteristic of LOW_TONE (the curve characteristic 5), the tone curve characteristic (the curve characteristic 2) of BASE_TONE, and the tone curve characteristic of HIGH_TONE (the curve characteristic 4).

In this embodiment, even in a case where the two or three tone curve characteristics whose high and low relationship changes in a manner that depends on the signal level range are selected, it does not affect the blend processing of the tone curve characteristics according to the blend ratio depending on the parameter as described above.

Second Embodiment

Next, a second embodiment according to the present technology will be described.

This embodiment pertains to an image pickup apparatus 10A in which a video signal processing unit having a tone control function is mounted.

Figure 14:
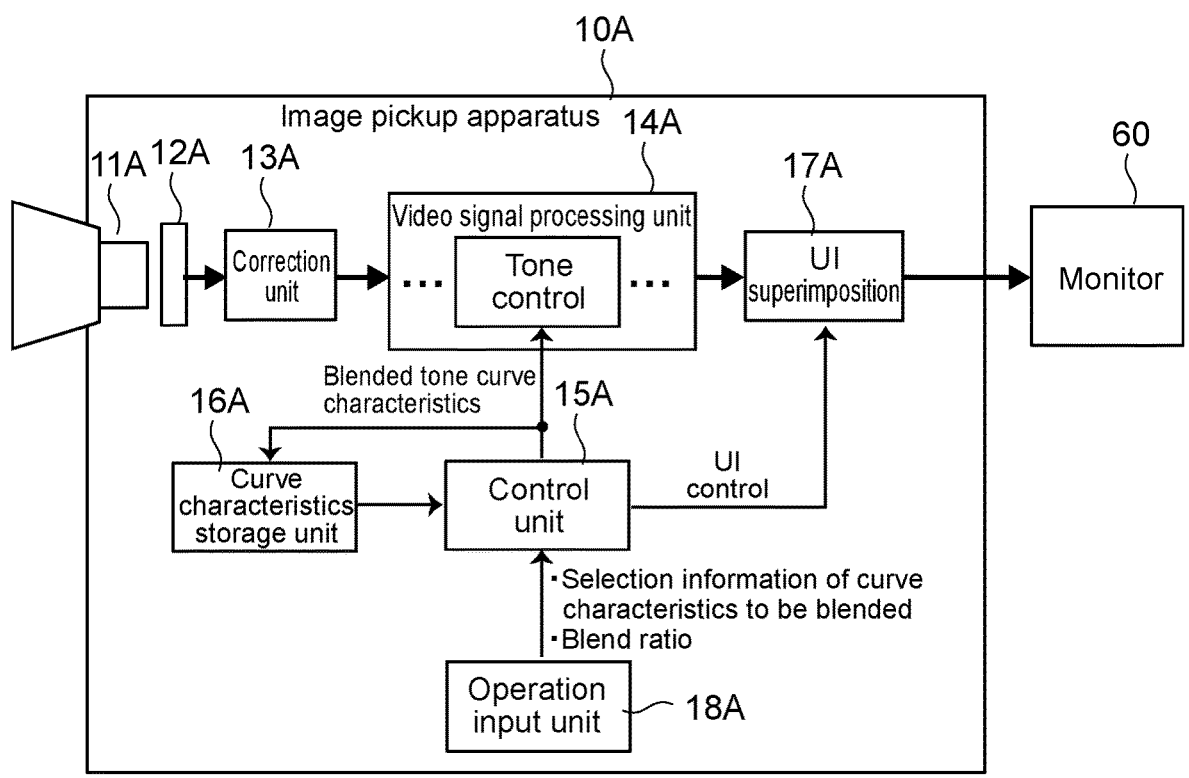
FIG. 14 A block diagram showing a configuration of an image pickup apparatus according to a second embodiment of the present technology.

FIG. 14 is a block diagram showing a configuration of the image pickup apparatus 10A according to this embodiment.

The image pickup apparatus 10A according to this embodiment includes an optical system 11A having a lens group for image pickup and an image pickup unit 12A that has an image pickup element such as a complementary metal-oxide-semiconductor (CMOS) element and a charge-coupled device (CCD) for example that converts light entering through the optical system 11A into an electric pixel signal depending on the light intensity. In addition, the image pickup apparatus 10A according to this embodiment includes a correction unit 13A, a video signal processing unit 14A, and a UI superimposing unit 17A. The correction unit 13A performs defective-pixel correction, shading correction, black-level correction, and the like with respect to an input video signal generated by the image pickup unit 12A. The video signal processing unit 14A performs, on the corrected video signal, addition of curve characteristics for video output and the like, such as tone control, matrix processing, detail and knee processing, SDR gamma processing, and HDR optical-electro transfer function (OETF) conversion, to thereby generate an output video signal. The UI superimposing unit 17A superimposes a UI image for setting associated with the blend processing of the tone curve characteristics on the generated output video signal. The generated output video signal or the output video signal on which the UI image is superimposed is transmitted to a monitor 60 such as a view finder and an external monitor for displaying the generated output video signal or the UI image.

In addition, the image pickup apparatus 10A according to this embodiment includes a control unit 15A, a curve characteristics storage unit 16A, and an operation input unit 18A. Information regarding a plurality of tone curve characteristics is stored in the curve characteristics storage unit 16A. The control unit 15A controls the image pickup apparatus 10A. Based on setting information provided by the user to the operation input unit 18A through the UI for setting associated with the blend processing of the tone curve characteristics, the control unit 15A generates tone curve characteristics to be set for tone control of the video signal processing unit 14A.

The operation input unit 18A may include, for example, operation keys, a mouse, a trackball, a dial, a lever, a touch sensor panel, a remote controller, and the like. More specifically, the operation input unit 18A may include a combination of a display provided in the main body of the image pickup apparatus 10A with a touch panel sensor disposed on this display and operation elements such as switches, buttons, and keys provided in the main body of the image pickup apparatus 10A.

In the image pickup apparatus 10A according to this embodiment, when the user selects two or three tone curve characteristics and a parameter by using the operation input unit 18A with respect to the setting UI associated with the blend processing of the tone curve characteristics superimposed on the output video signal and displayed on the monitor 60 such as the view finder and the external monitor, the control unit 15A calculates, on the basis of the parameter, two tone curve characteristics to be blended out of the two or three tone curve characteristics, which are selected by the user, and a blend ratio of these two tone curve characteristics and generates tone curve characteristics obtained by blending these two tone curve characteristics at the blend ratio. The control unit 15A sets the generated tone curve characteristics to the video signal processing unit 14A. Accordingly, an output video signal subjected to signal processing such as tone control on the basis of the blended tone curve characteristics is obtained from the video signal processing unit 14A and is displayed on the monitor 60.

When the user changes the parameter by further operating the operation input unit 18A from this state, the control unit 15A calculates, on the basis of the changed parameter, the two tone curve characteristics to be blended and the blend ratio of these two tone curve characteristics, generates new tone curve characteristics obtained by blending these two tone curve characteristics at the blend ratio, and sets these new tone curve characteristics to the video signal processing unit 14A again. Accordingly, the user can check in real time how the change in blend ratio based on the parameter is reflected on the tone of the output video signal.

Modified Example 1

Figure 15:
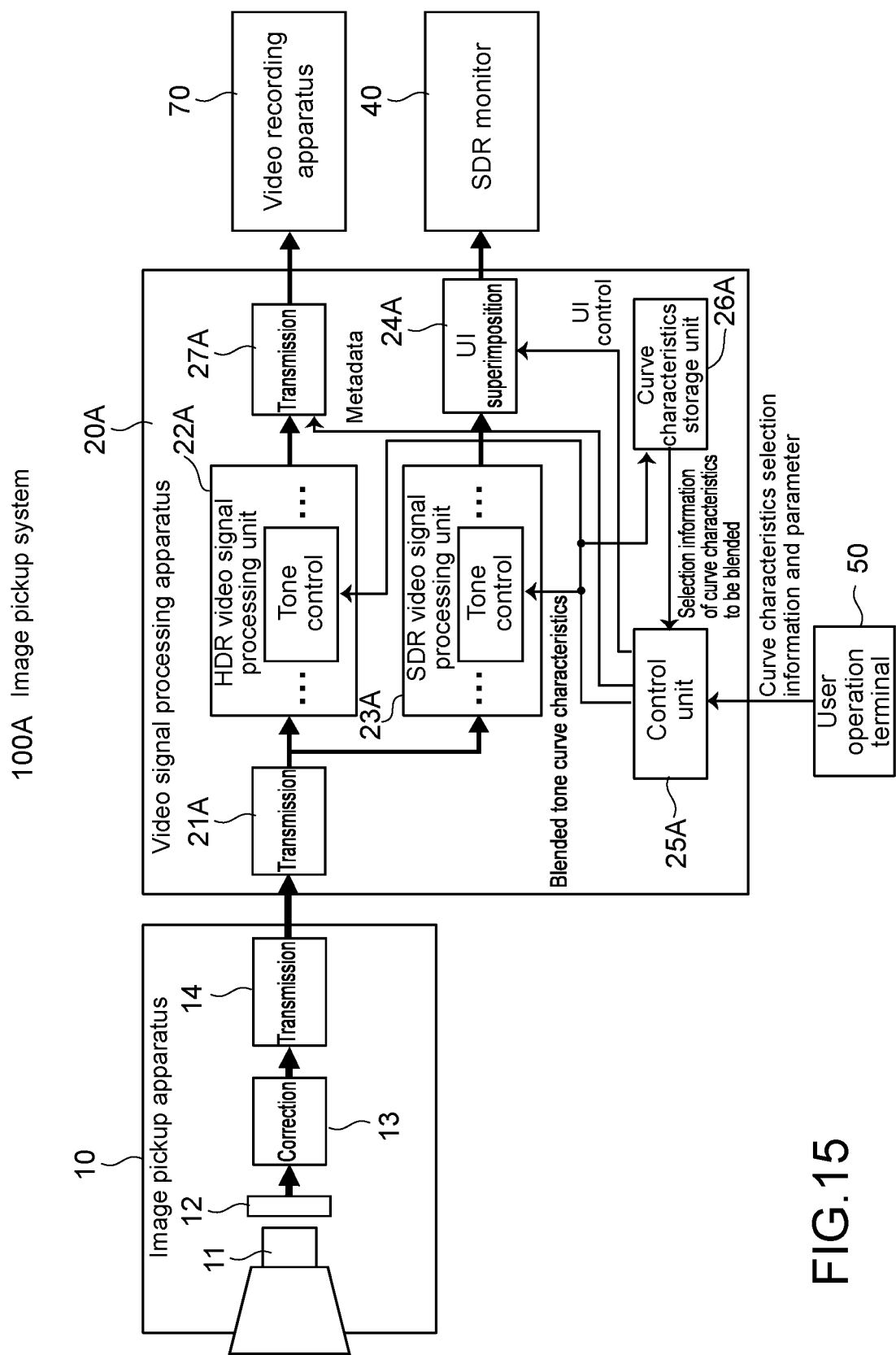
FIG. 15 A block diagram showing a configuration of an image pickup system 100A that is a modified example of the first embodiment of the present technology.

FIG. 15 is a block diagram showing a configuration of an image pickup system 100A that is a modified example of the above-mentioned first embodiment.

The image pickup system 100A according to this modified example is an image pickup system configured to be capable of transmitting an output video signal to an external video recording apparatus 70 for recording the output video signal. The output video signal is generated by a video signal processing apparatus 20A. The video signal processing apparatus 20A includes an HDR video signal processing unit 22A and an SDR video signal processing unit 23A. The HDR video signal processing unit 22A and the SDR video signal processing unit 23A are capable of performing tone control on the basis of blended tone curve characteristics.

In order to enable tone control of the output video signal according to a parameter change that is performed by the user to be performed with respect to the video signal recorded in the video recording apparatus 70 again, a control unit 25A controls, when transmitting the output video signal generated by the video signal processing apparatus 20A to the external video recording apparatus 70 and recording the output video signal, a transmission unit 27A to add identification information such as a file name of information regarding arbitrary two or three tone curve characteristics selected by the user and the parameter selected by the user, as metadata, to a transmission video signal, and transmits the transmission video signal and the metadata. The transmission unit 27A adds the metadata to the output video signal, converts the video signal and the metadata according to a signal system suitable for transmission by compression or the like, and transmits the video signal and the metadata to the video recording apparatus 70.

The video recording apparatus 70 encodes the transmitted video signal and metadata and records the encoded video signal and metadata in storage such as an internal hard disk drive and an internal semiconductor memory device or in a removable recording medium.

Figure 16:
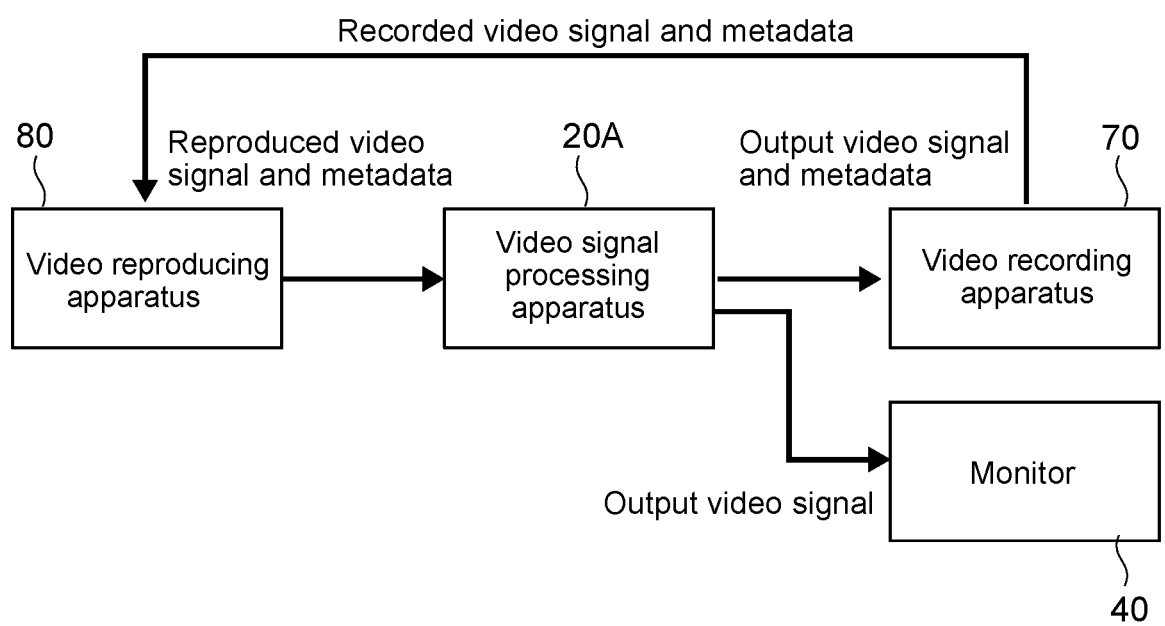
FIG. 16 A block diagram showing a configuration of an image pickup system that is a modified example of the present technology including a video recording apparatus and a video reproducing apparatus.

The video signal and metadata recorded by the video recording apparatus 70 in the storage or the recording medium are decoded and reproduced by a video reproducing apparatus 80 as shown in FIG. 16. When the video signal processing apparatus 20A receives the video signal and metadata decoded and reproduced by the video reproducing apparatus 80, the control unit 25A of the video signal processing apparatus 20A extracts from the metadata the information regarding the two or three tone curve characteristics and the parameter. Then, the control unit 25A calculates, on the basis of the parameter, two tone curve characteristics to be blended and a blend ratio of these two tone curve characteristics, generates new tone curve characteristics obtained by blending these two tone curve characteristics at the blend ratio, and sets these new tone curve characteristics to the video signal processing apparatus 20A. Accordingly, the environment when the tone curve characteristics added to the video signal have been previously determined by parameter selection can be restored and tone curve characteristics to be added anew can be determined by parameter selection.

Modified Example 2

Hereinabove, the configuration in which the control unit 25 or 25A of the video signal processing apparatus 20 or 20A and the control unit 15A of the image pickup apparatus 10 perform the blend processing of the tone curve characteristics has been described. However, an information processing apparatus such as a personal computer connected to the video signal processing apparatus 20, 20A or the image pickup apparatus 10 may perform control and blend processing similar to those of the control units 25 or 25A and 15A on the basis of an application program.

Application Examples

The technology according to the present disclosure can be applied to various products. For instance, the technology according to the present disclosure may be applied to an operating room system.

Figure 17:
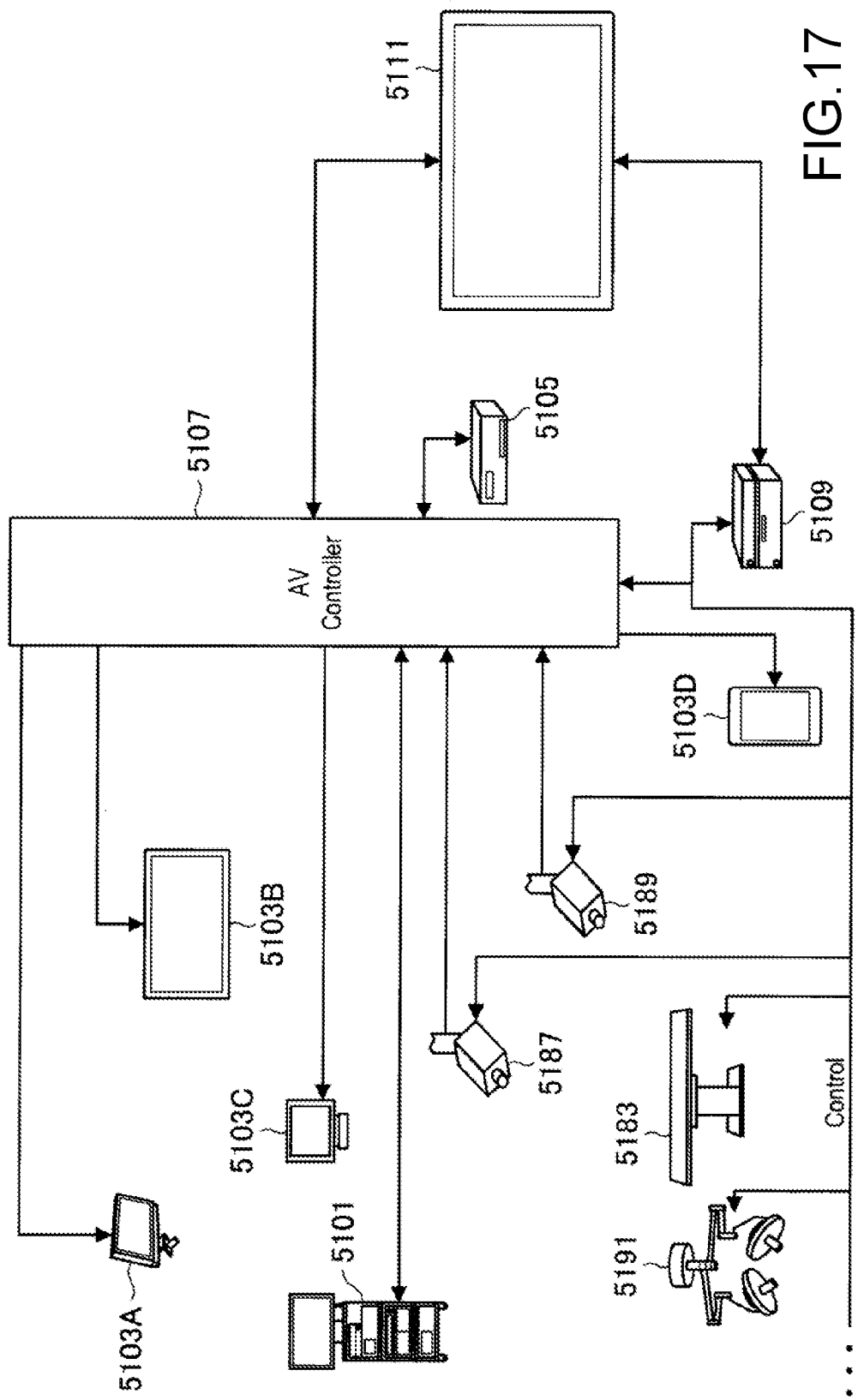
FIG. 17 is a view schematically depicting a general configuration of an operating room system.

FIG. 17 is a view schematically depicting a general configuration of an operating room system 5100 to which the technology according to an embodiment of the present disclosure can be applied. Referring to FIG. 17, the operating room system 5100 is configured such that a group of apparatus installed in an operating room are connected for cooperation with each other through an audiovisual (AV) controller 5107 and an operating room controlling apparatus 5109.

In the operating room, various apparatus may be installed. In FIG. 17, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of an operating room and images the hands of a surgeon. The surgery field camera 5189 is provided on the ceiling of the operating room and images a state of the entire operating room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the operating room separately from the endoscopic surgery system 5113. The apparatus which do not belong to the endoscopic surgery system 5113 are referred to also as non-medical equipment. The audiovisual controller 5107 and/or the operating room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the operating room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body cavity of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire operating room may be transmitted as display information. It is to be noted that, if a different apparatus having an image pickup function exists in the operating room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107.

The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the operating room; the display apparatus 5103B is a display apparatus installed on a wall face of the operating room; the display apparatus 5103C is a display apparatus installed on a desk in the operating room; and the display apparatus 5103D is a mobile apparatus (for example, a tablet personal computer (PC)) having a display function.

Further, though not depicted in FIG. 17, the operating room system 5100 may include an apparatus outside the operating room. The apparatus outside the operating room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The operating room controlling apparatus 5109 integrally controls processes other than processes relating to image display on the non-medical equipment. For example, the operating room controlling apparatus 5109 controls driving of the patient bed 5183, the ceiling camera 5187, the surgery field camera 5189 and the illumination 5191.

In the operating room system 5100, a centralized operation panel 5111 is provided such that it is possible to issue an instruction regarding image display to the audiovisual controller 5107 or issue an instruction regarding operation of the non-medical equipment to the operating room controlling apparatus 5109 through the centralized operation panel 5111. The centralized operation panel 5111 is configured by providing a touch panel on a display face of a display apparatus.

Figure 18:
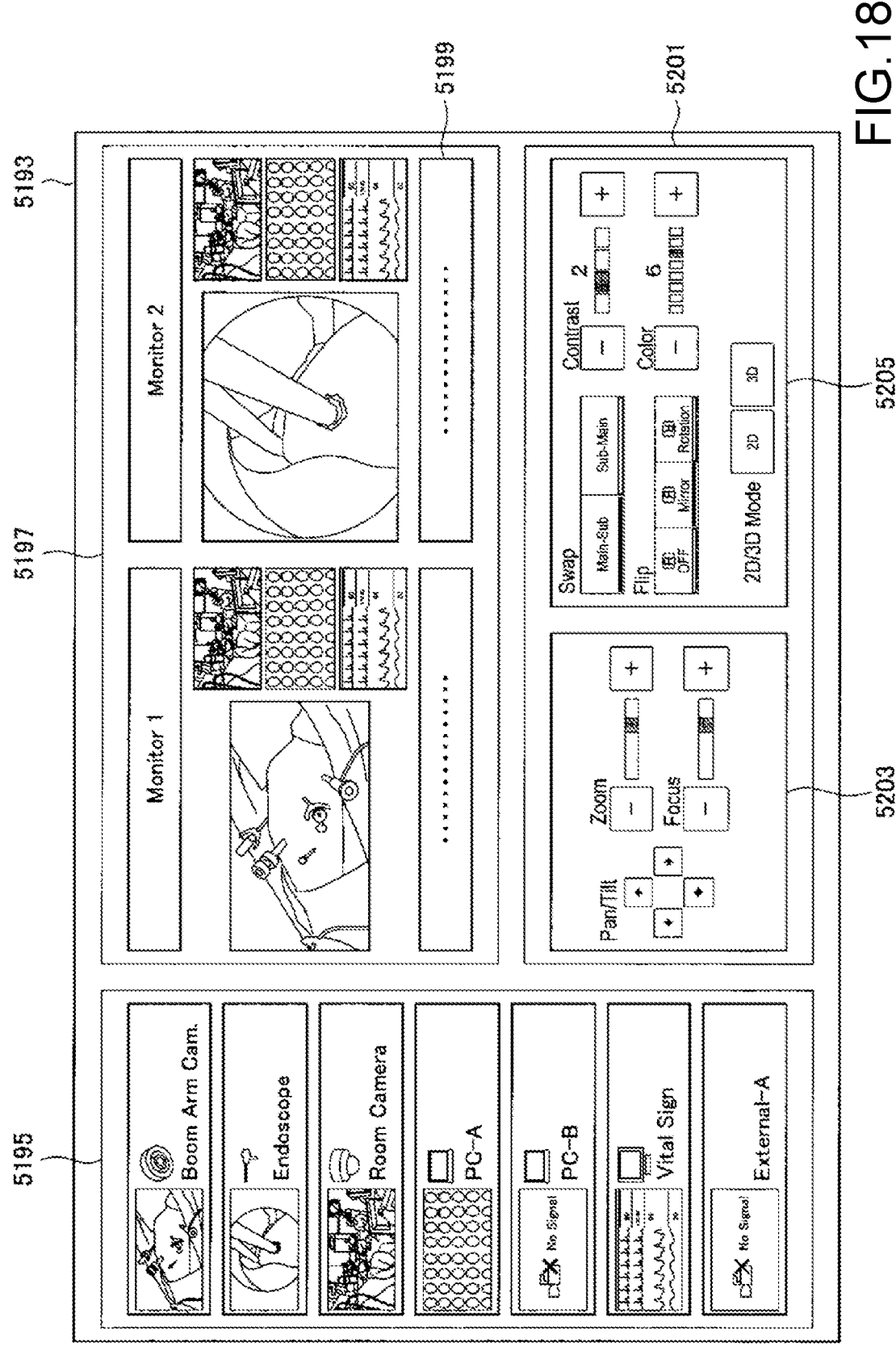
FIG. 18 is a view depicting an example of display of an operation screen image of a centralized operation panel.

FIG. 18 is a view depicting an example of display of an operation screen image on the centralized operation panel 5111. In FIG. 18, as an example, an operation screen image is depicted which corresponds to a case in which two display apparatus are provided as apparatus of an output destination in the operating room system 5100. Referring to FIG. 18, the operation screen image 5193 includes a sending source selection region 5195, a preview region 5197 and a control region 5201.

In the sending source selection region 5195, the sending source apparatus provided in the operating room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the operating room controlling apparatus 5109 provided in the operating room system 5100 through the centralized operation panel 5111.

Figure 19:
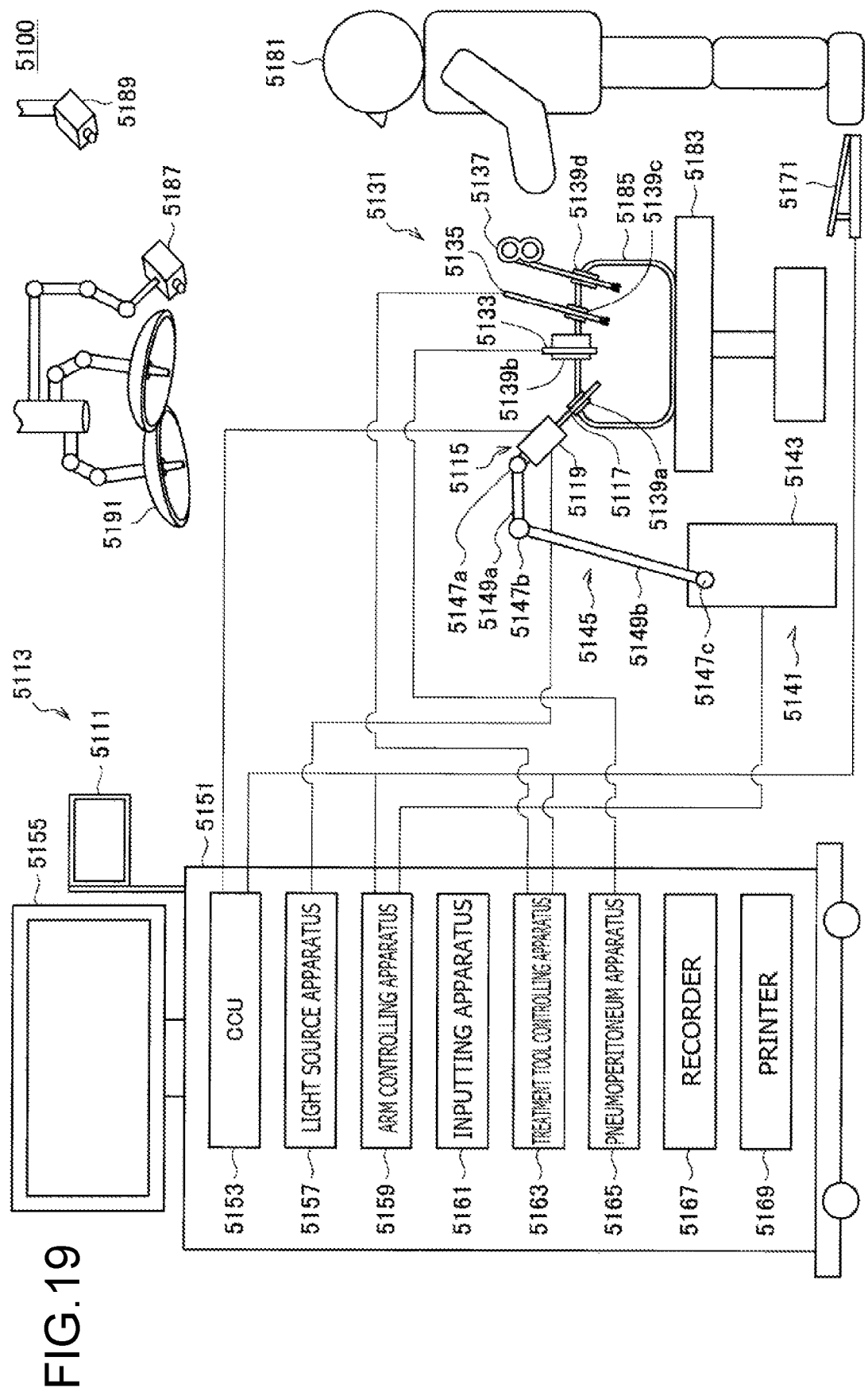
FIG. 19 is a view illustrating an example of a state of surgery to which the operating room system is applied.

FIG. 19 is a view illustrating an example of a state of surgery to which the operating room system described above is applied. The ceiling camera 5187 and the surgery field camera 5189 are provided on the ceiling of the operating room such that it can image the hands of a surgeon (medical doctor) 5181 who performs treatment for an affected area of a patient 5185 on the patient bed 5183 and the entire operating room. The ceiling camera 5187 and the surgery field camera 5189 may include a magnification adjustment function, a focal distance adjustment function, an imaging direction adjustment function and so forth. The illumination 5191 is provided on the ceiling of the operating room and irradiates at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the operating room controlling apparatus 5109 (not depicted in FIG. 19) as depicted in FIG. 17. The centralized operation panel 5111 is provided in the operating room, and the user can suitably operate the apparatus existing in the operating room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139a to 5139d are used to puncture the abdominal wall. Then, a lens barrel 5117 of the endoscope 5115 and the other surgical tools 5131 are inserted into body cavity of the patient 5185 through the trocars 5139a to 5139d. In the example depicted, as the other surgical tools 5131, a pneumoperitoneum tube 5133, an energy device 5135 and forceps 5137 are inserted into body cavity of the patient 5185. Further, the energy device 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, tweezers or a retractor may be used.

An image of a surgical region in a body cavity of the patient 5185 picked up by the endoscope 5115 is displayed on a display apparatus 5155. The surgeon 5181 would use the energy device 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy device 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147a, 5147b and 5147c and links 5149a and 5149b and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body cavity of the patient 5185, and a camera head 5119 connected to a proximal end of the lens barrel 5117. In the example depicted, the endoscope 5115 is depicted as a rigid endoscope having the lens barrel 5117 of the hard type. However, the endoscope 5115 may otherwise be configured as a flexible endoscope having the lens barrel 5117 of the flexible type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is applied toward an observation target in a body cavity of the patient 5185 through the objective lens. It is to be noted that the endoscope 5115 may be a forward-viewing endoscope or may be an oblique-viewing endoscope or a side-viewing endoscope.

The optical system 11 and an image pickup element are provided in the inside of the camera head 5119 such that reflected light (observation light) from an observation target is condensed on the image pickup element by the optical system 11. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system 11 of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 17 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy device 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy device 5135 for cautery or incision of a tissue, sealing of a blood vessel or the like. A pneumoperitoneum apparatus 5165 feeds gas into a body cavity of the patient 5185 through the pneumoperitoneum tube 5133 to inflate the body cavity in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 19, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body cavity of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the operating room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are applied time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue, narrow band light observation (narrow band imaging) of imaging a predetermined tissue such as a blood vessel of a superficial portion of the mucous membrane or the like in a high contrast is performed by applying light of a narrower wavelength band in comparison with irradiation light upon ordinary observation (namely, white light). Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 20:
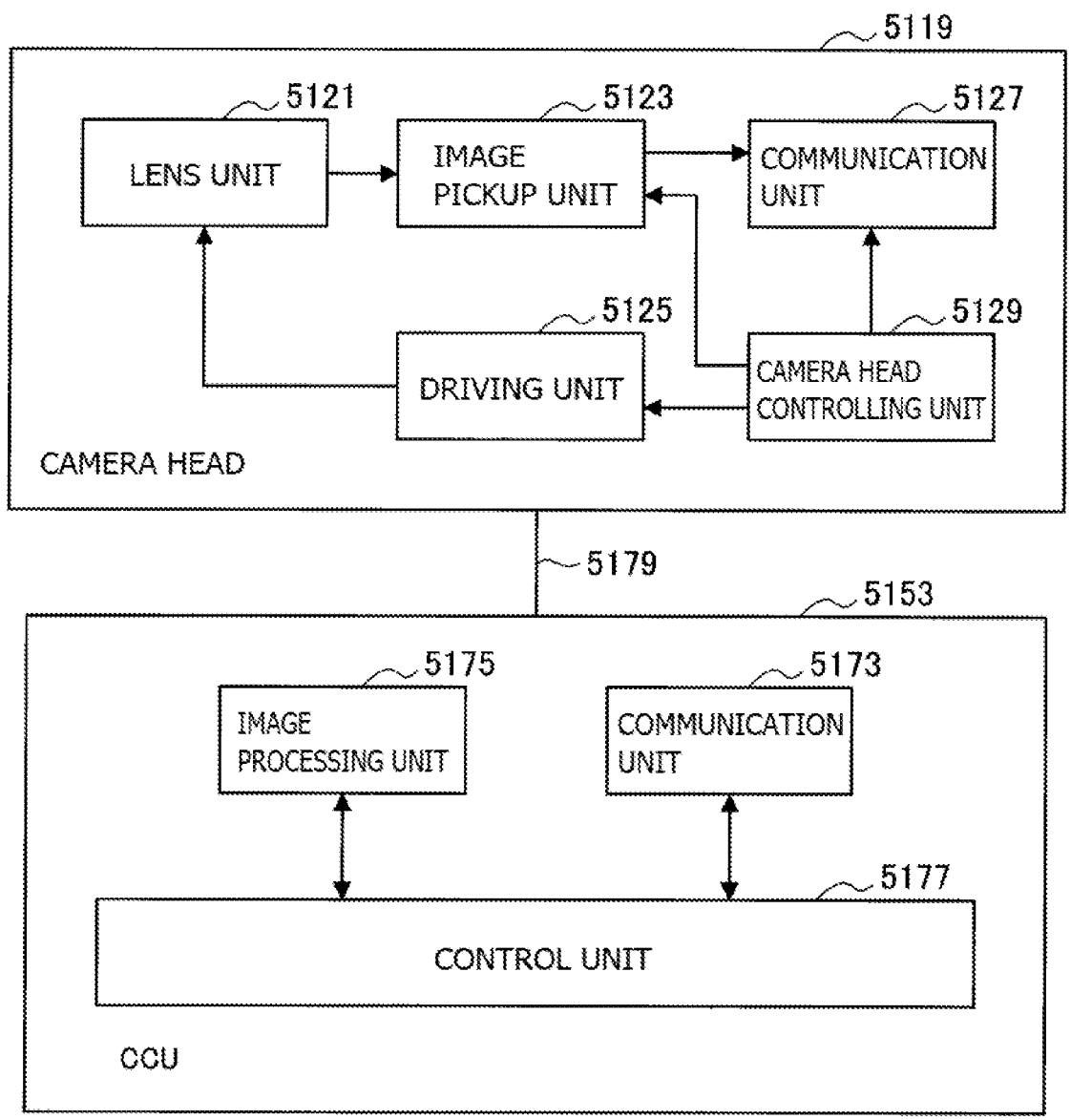
FIG. 20 is a block diagram depicting an example of a functional configuration of a camera head and a camera control unit (CCU) depicted in FIG. 19.

Functions of the camera head 5119 of the endoscope 5115 and the CCU 5153 are described in more detail with reference to FIG. 20. FIG. 20 is a block diagram depicting an example of a functional configuration of the camera head 5119 and the CCU 5153 depicted in FIG. 19.

Referring to FIG. 20, the camera head 5119 has, as functions thereof, a lens unit 5121, an image pickup unit 5123, a driving unit 5125, a communication unit 5127 and a camera head controlling unit 15A5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is the optical system 11 provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 15A5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 15A5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 15A5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 15A5129 controls driving of the camera head 5119 on the basis of a control signal from the CCU 5153 received through the communication unit 5127. For example, the camera head controlling unit 15A5129 controls driving of the image pickup element of the image pickup unit 5123 on the basis of information that a frame rate of a picked up image is designated and/or information that an exposure value upon image picking up is designated. Further, for example, the camera head controlling unit 15A5129 controls the driving unit 5125 to suitably move the zoom lens and the focus lens of the lens unit 5121 on the basis of information that a magnification and a focal point of a picked up image are designated. The camera head controlling unit 15A5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also, the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy device 5135 is used and so forth by detecting the shape, color and so forth of edges of the objects included in the surgical region image. The control unit 5177 causes, when it controls the display apparatus 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the operating room. Therefore, such a situation that movement of medical staff in the operating room is disturbed by the transmission cable 5179 can be eliminated.

An example of the operating room system 5100 to which the technology according to an embodiment of the present disclosure can be applied has been described above. It is to be noted here that, although a case in which the medical system to which the operating room system 5100 is applied is the endoscopic surgery system 5113 has been described as an example, the configuration of the operating room system 5100 is not limited to that of the example described above. For example, the operating room system 5100 may be applied to a soft endoscopic system for inspection or a microscopic surgery system in place of the endoscopic surgery system 5113.

The technology according to the present disclosure can be favorably applied to tone control of an image of a surgical region in a body cavity of a patient imaged by the endoscope of the above-mentioned configurations. Specifically, an image with the optimal tone can be obtained for each diagnosis region by setting the optimal parameter in accordance with characteristics of the diagnosis region (a digestive organ, a circulatory organ, or the like), and the observation accuracy can be improved.

Moreover, the technology according to the present disclosure is used for setting a tone intended by the user in view of a difference in characteristics that depends on the manufacturer or the type of the endoscope.

The above-mentioned tone control may be manually operated and performed by the user or may be automatically performed.

It is to be noted that the present technology may also take the following configurations.

(1) A video signal processing apparatus, including:
  a control unit that blends two tone curve characteristics selected from among a plurality of tone curve characteristics prepared in advance; and
  a signal processing unit that performs processing of adding the tone curve characteristics blended by the control unit to an input video signal having a linear characteristic.
(2) The video signal processing apparatus according to (1), in which
  the control unit blends a plurality of tone curve characteristics at a ratio selected by a user.
(3) The video signal processing apparatus according to (2), further including
  a user interface that receives, from the user, selection of arbitrary two or three tone curve characteristics from among four or more tone curve characteristics prepared in advance and receives, from the user, selection of two tone curve characteristics to be blended out of the two or three tone curve characteristics and a parameter for calculating a blend ratio of the two tone curve characteristics.
(4) The video signal processing apparatus according to any of (1) to (3), in which
  the control unit reads from the storage unit information regarding two or three tone curve characteristics selected by the user.
(5) The video signal processing apparatus according to (4), in which
  the control unit saves the information regarding the blended tone curve characteristics in the storage unit.
(6) The video signal processing apparatus according to any of (1) to (5), in which
  the signal processing unit performs tone control by using a look-up table.
(7) video signal processing apparatus according to any of (1) to (6), in which
  the information regarding the tone curve characteristics is a correspondence table between an input signal and an output signal.
(8) The video signal processing apparatus according to any of (3) to (7), further including
  a user interface superimposing unit that superimposes an image of the user interface on an output video signal of the signal processing unit.
(9) The video signal processing apparatus according to any of (3) to (8), in which
  the control unit performs control to transmit transmission information to a video recording apparatus, the transmission information being obtained by adding metadata to the output video signal of the signal processing unit, the metadata including information regarding the selected two or three tone curve characteristics and the parameter.
(10) A video signal processing method, including:
  by a control unit,
  blending two tone curve characteristics arbitrarily selected from among a plurality of tone curve characteristics prepared in advance; and
  setting the blended tone curve characteristics to a signal processing unit that adds the blended tone curve characteristics to an input video signal having a linear characteristic.
(11) The video signal processing method according to any of (4) to (8), in which
  the control unit blends a plurality of tone curve characteristics at a ratio selected by a user.
(12) The video signal processing method according to (11), in which
  the control unit controls a user interface that receives, from the user, selection of arbitrary two or three tone curve characteristics from among four or more tone curve characteristics prepared in advance and receives, from the user, selection of two tone curve characteristics to be blended out of the two or three tone curve characteristics and a parameter for calculating a blend ratio of the two tone curve characteristics.

(13) The video signal processing method according to any of (10) to (12), in which
the control unit reads from the storage unit information regarding two or three tone curve characteristics selected by the user.
(14) The video signal processing method according to (13), in which
the control unit saves the information regarding the blended tone curve characteristics in the storage unit.
(15) The video signal processing method according to any of (10) to (14), in which
the signal processing unit performs tone control by using a look-up table.
(16) The video signal processing method according to any of (10) to (15), in which
the information regarding the tone curve characteristics is a correspondence table between an input signal and an output signal.
(17) The video signal processing method according to any of (12) to (16), further including
superimposing an image of the user interface on an output video signal subjected to the tone control and outputs the image of the user interface and the output video signal.
(18) The video signal processing method according to any of (12) to (16), in which
the control unit performs control to transmit transmission information to a video recording apparatus, the transmission information obtained by adding metadata to the output video signal subjected to the tone control, the metadata including information regarding the two or three tone curve characteristics and the parameter that are selected by the user through the user interface.
(19) An image pickup apparatus, including:
an image pickup unit having an image pickup element;
a control unit that blends two tone curve characteristics selected from among a plurality of tone curve characteristics prepared in advance; and
a signal processing unit that performs processing of adding the tone curve characteristics blended by the control unit to an input video signal having a linear characteristic, the input video signal being generated by the image pickup unit.
(20) The image pickup apparatus according to (19), in which
the control unit blends a plurality of tone curve characteristics at a ratio selected by a user.
(21) The image pickup apparatus according to (20), further including
a user interface that receives, from the user, selection of arbitrary two or three tone curve characteristics from among four or more tone curve characteristics prepared in advance and receives, from the user, selection of two tone curve characteristics to be blended out of the two or three tone curve characteristics and a parameter for calculating a blend ratio of the two tone curve characteristics.
(22) The image pickup apparatus according to any of (19) to (21), in which
the control unit reads from the storage unit information regarding two or three tone curve characteristics selected by the user.
(23) The image pickup apparatus according to (22), in which
the control unit saves the information regarding the blended tone curve characteristics in the storage unit.
(24) The image pickup apparatus according to any of (19) to (23), in which
the signal processing unit performs tone control by using a look-up table.
(25) The image pickup apparatus according to any of (19) to (24), in which
the information regarding the tone curve characteristics is a correspondence table between an input signal and an output signal.
(26) The image pickup apparatus according to any of (21) to (25), further including
a user interface superimposing unit that superimposes an image of the user interface on an output video signal of the signal processing unit.

REFERENCE SIGNS LIST 10 image pickup apparatus
12 image pickup unit
13 correction unit
14A video signal processing unit
15A control unit
16A curve characteristics storage unit
17A UI superimposing unit
18A operation input unit
20 video signal processing method
22 HDR video signal processing unit
23 SDR video signal processing unit
24 UI superimposing unit
25 control unit
26 curve characteristics storage unit
50 user operation terminal
100 image pickup system

The invention claimed is:

1. A video signal processing apparatus, comprising:
control circuitry configured to blend, based on a value of a single blend ratio input by a user, three tone curve characteristics arbitrarily selected from among a plurality of tone curve characteristics prepared in advance;
signal processing circuitry configured to perform processing of applying the three tone curve characteristics blended by the control circuitry to an input video signal having a linear characteristic; and
a user interface that receives, from the user, selection of the three tone curve characteristics from among four or more tone curve characteristics prepared in advance, and receives, from the user, a parameter for calculating the value of the single blend ratio.

2. The video signal processing apparatus according to claim 1, wherein
the control circuitry is further configured to read, from a memory, information regarding the three tone curve characteristics selected by the user.

3. The video signal processing apparatus according to claim 2, wherein the control circuitry is further configured to save the information regarding the blended tone curve characteristics in the memory.

4. The video signal processing apparatus according to claim 3, wherein the signal processing circuitry is further configured to perform the processing by using a look-up table.

5. The video signal processing apparatus according to claim 4, wherein the information regarding the tone curve characteristics is a correspondence table between an input signal and an output signal.

6. The video signal processing apparatus according to claim 1, further comprising user interface superimposing circuitry configured to superimpose an image of the user interface on an output video signal of the signal processing circuitry.

7. The video signal processing apparatus according to claim 1, wherein the control circuitry is further configured to perform control to transmit transmission information to a video recording apparatus, the transmission information being obtained by adding metadata to the output video signal of the signal processing circuitry, the metadata including information regarding the selected two or three tone curve characteristics and the parameter.

8. A video signal processing method, comprising:
- a user interface that receives, from the user, selection of three tone curve characteristics from among four or more tone curve characteristics prepared in advance, and receives, from the user, a parameter for calculating a value of a single blend ratio;
- blending, by control circuitry based on the value of the single blend ratio input by the user, the three tone curve characteristics;
- setting the blended tone curve characteristics to signal processing circuitry that applies the blended tone curve characteristics to an input video signal having a linear characteristic.

9. An image pickup apparatus, comprising:
- an image pickup unit having an image pickup element;
- control circuitry configured to blend, based on a value of a single blend ratio input by a user, three tone curve characteristics arbitrarily selected from among a plurality of tone curve characteristics prepared in advance;
- signal processing circuitry configured to perform processing of applying the tone curve characteristics blended by the control circuitry to an input video signal having a linear characteristic, the input video signal being generated by the image pickup unit; and
- a user interface that receives, from the user, selection of the three tone curve characteristics from among four or more tone curve characteristics prepared in advance, and receives, from the user, a parameter for calculating the value of the single blend ratio.

* * * * *